United States Patent

Maruyama

(10) Patent No.: US 9,491,149 B2
(45) Date of Patent: Nov. 8, 2016

(54) COMPUTER PRODUCT, RECORDING MEDIUM, COMMUNICATIONS APPARATUS, AND COMMUNICATIONS METHOD

(71) Applicant: FUJITSU LIMITED, Kawasaki-shi, Kanagawa (JP)

(72) Inventor: Hidefumi Maruyama, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/582,855

(22) Filed: Dec. 24, 2014

(65) Prior Publication Data
US 2015/0113280 A1    Apr. 23, 2015

Related U.S. Application Data

(63) Continuation of application No. PCT/JP2012/066814, filed on Jun. 29, 2012.

(51) Int. Cl.
*H04L 29/00* (2006.01)
*H04L 29/06* (2006.01)
*H04L 9/08* (2006.01)

(52) U.S. Cl.
CPC ......... *H04L 63/0428* (2013.01); *H04L 9/0822* (2013.01); *H04L 9/0891* (2013.01); *H04L 63/0435* (2013.01); *H04L 63/061* (2013.01);
(Continued)

(58) Field of Classification Search
CPC .................................... H04L 9/30; H04K 9/00
USPC ......................................................... 713/171
See application file for complete search history.

(56) References Cited

U.S. PATENT DOCUMENTS

2004/0083393 A1    4/2004    Jordan et al.
2008/0059806 A1    3/2008    Kishida et al.
(Continued)

FOREIGN PATENT DOCUMENTS

JP    11-136234    5/1999
JP    2001-249899    9/2001
(Continued)

OTHER PUBLICATIONS

International Search Report mailed Jul. 31, 2012, in corresponding International Patent Application No. PCT/JP2012/066814 (4 pages).
(Continued)

*Primary Examiner* — Anthony Brown
*Assistant Examiner* — Michael D Anderson
(74) *Attorney, Agent, or Firm* — Staas & Halsey LLP

(57) ABSTRACT

Improvement of the security of communication is facilitated. A server receives from an on-vehicle device, encrypted data obtained by encrypting ECU information using key information (111-1#C), and identification information (112-1#C). Thereafter, the server determines from the identification information (112-1#C), whether identification information of a next key to be used after identification information (112-1) is stored. The server determines that the identification information of the next key to be used after the identification information (112-1) is not stored, and obtains key information (111-2#S) and identification information (112-2#S) to identify key information (111-2) as the next key. The server encrypts the key information (111-2#S) and the identification information (112-2#S) using key information (111-1#S), and transmits encrypted data and identification information (112-1#S) to the on-vehicle device.

6 Claims, 30 Drawing Sheets

(52) U.S. Cl.
CPC ......... *H04L 63/068* (2013.01); *H04L 2209/84* (2013.01); *H04L 2463/062* (2013.01)

(56) References Cited

U.S. PATENT DOCUMENTS

| 2011/0010435 | A1 | 1/2011 | Okaya et al. |
| 2011/0150223 | A1* | 6/2011 | Qi ........................ H04W 12/04 380/273 |
| 2012/0057696 | A1* | 3/2012 | Chew ........................ H04L 9/14 380/30 |
| 2012/0155647 | A1 | 6/2012 | Zhang et al. |

FOREIGN PATENT DOCUMENTS

| JP | 2003-110549 | 4/2003 |
| JP | 2003-174444 | 6/2003 |
| JP | 2003-244123 | 8/2003 |
| JP | 2008-059450 | 3/2008 |
| JP | 2008-067074 | 3/2008 |
| JP | 2009-104767 | 5/2009 |
| JP | 2009-267562 | 11/2009 |
| JP | 2010-273181 | 12/2010 |

OTHER PUBLICATIONS

Extended European Search Report dated Jul. 13, 2015 in corresponding European Patent Application No. 12879786.7.
International Preliminary Report on Patentability dated Jan. 8, 2015 in corresponding International Patent Application No. PCT/JP2012/066814.

* cited by examiner

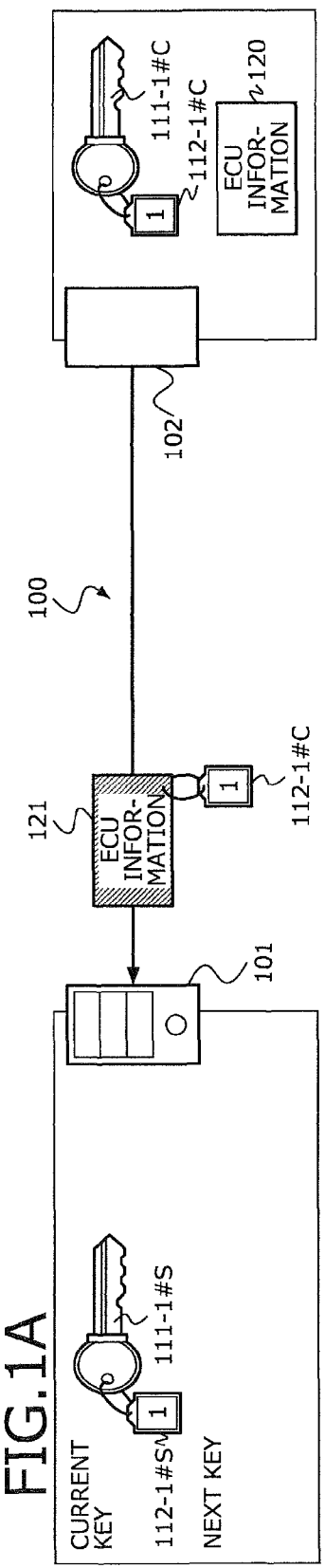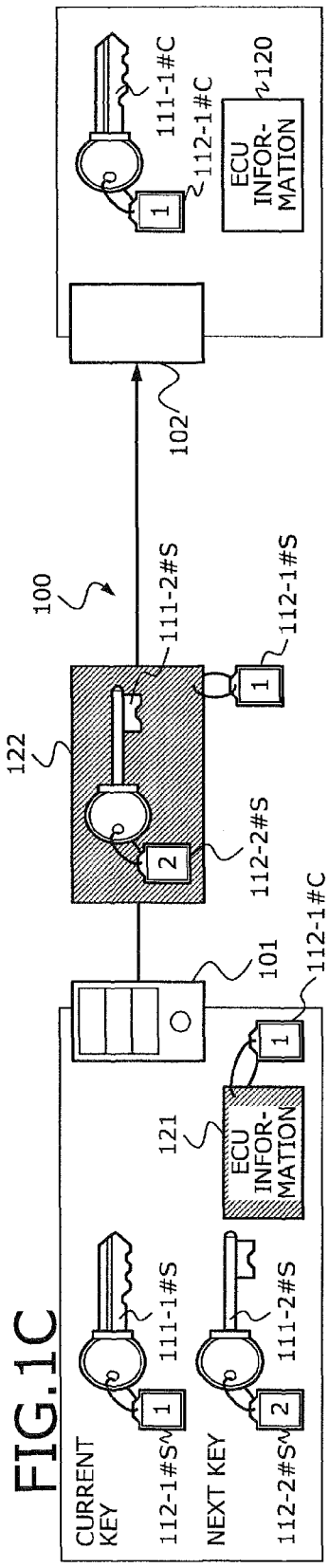

| TERMI-NAL ID | GENERA-TION NUMBER | FUNDAMEN-TAL DATA LENGTH | FUNDAMEN-TAL DATA | SHARE FLAG | APPLICATION STARTING TIME | NEW GENERATION NUMBER | PRE-SWITCHING GENERATION NUMBER |
|---|---|---|---|---|---|---|---|
| 1 | 1 | 128 | abc... | FINISHED | 2012/01/01, 12:00 | 0 | 0 |
| 1 | 2 | 128 | def... | FINISHED | (null) | 0 | 0 |
| 1 | 3 | 128 | ghi... | FINISHED | (null) | 0 | 0 |
| 1 | 4 | 0 | (null) | UNFINISHED | (null) | 0 | 0 |
| ... | ... | ... | ... | ... | ... | ... | ... |
| 1 | 10 | 0 | (null) | UNFINISHED | (null) | 0 | 0 |
| 2 | 1 | ... | ... | ... | ... | ... | ... |
| ... | ... | ... | ... | ... | ... | ... | ... |

401 SERVER FUNDAMENTAL-DATA MANAGEMENT TABLE 401-1, 401-2, 401-3, 401-4, 401-10, 401-11

COMPUTER PRODUCT, RECORDING MEDIUM, COMMUNICATIONS APPARATUS, AND COMMUNICATIONS METHOD

CROSS REFERENCE TO RELATED APPLICATIONS

This application is a continuation application of International Application PCT/JP2012/066814, filed on Jun. 29, 2012 and designating the U.S., the entire contents of which are incorporated herein by reference.

FIELD

The embodiments discussed herein are related to a computer product, a recording medium, a communications apparatus, and a communications method.

BACKGROUND

According to a conventional technique, communication between a server and a client is performed using a common key encryption method. For example, according to another technique, in a client-server system, a client and a server each retain a key storing unit to store predetermined common keys whose generations differ from each other, and execute communication using one common key among the predetermined common keys.

According to another related technique, for example, in communication between an on-vehicle device in a vehicle and a server, a portable apparatus is used to authenticate the qualification to rewrite information of the on-vehicle device. According to yet another technique, a communicating state is migrated from an information communication apparatus using a telephone line network or an Internet protocol (IP) communication network, to an on-vehicle device, or the communicating state is migrated from the on-vehicle device to the information communication apparatus.

According to another technique, a common key encryption method is used between a server and a communications terminal, and between the communications terminal and an apparatus to be controlled. According to yet another technique, a server and a communications terminal execute communication using a common key; when a connection request is issued from the communications terminal and it is confirmed that the communications terminal does not retain any common key, the server transmits a common key to the communications terminal. According to another disclosed technique, when a common key for data is updated between a server and a communications terminal, the common key after the updating is encrypted using the common key before the updating and is transmitted to the communications terminal (see, e.g., Japanese Laid-Open Patent Publication Nos. 2003-174444; 2008-59450: 2009-267562; 2001-249899; 2003-244123; and 2008-67074.)

SUMMARY

According to an aspect of an embodiment, a non-transitory computer-readable recording medium stores therein a communication program that causes a computer to execute a process including receiving encrypted data and identification information of a first key with which the encrypted data was encrypted, from a communication counterpart apparatus, the first key being one of a plurality of keys used for a common key encryption between the computer and the communication counterpart apparatus; determining whether identification information of a second key is stored in the computer correlated with the identification information of the first key based on the identification information of the first key and a key storing information stored in a storing unit of the computer, the second key being one of the plurality of keys and to be used subsequent to the first key, the key storing information storing information about the plurality of keys and a plurality of identification information corresponding of the plurality of the key; obtaining information of a third key and an identification information of the third key, the third key being one of the plurality of keys and different from the first key and the second key and the information of the third key being stored in the storing unit; updating the key storing information by correlating the identification information of the third key with the identification information of the first key; encrypting the third key and the identification information of the third key with the first key; and transmitting the encrypted third key, the encrypted identification information of the third key, and the identification information of the first key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A, 1B, and 1C are diagrams for explaining an example of operation of a communications system according to an embodiment;

DESCRIPTION OF EMBODIMENTS

Figure 2:
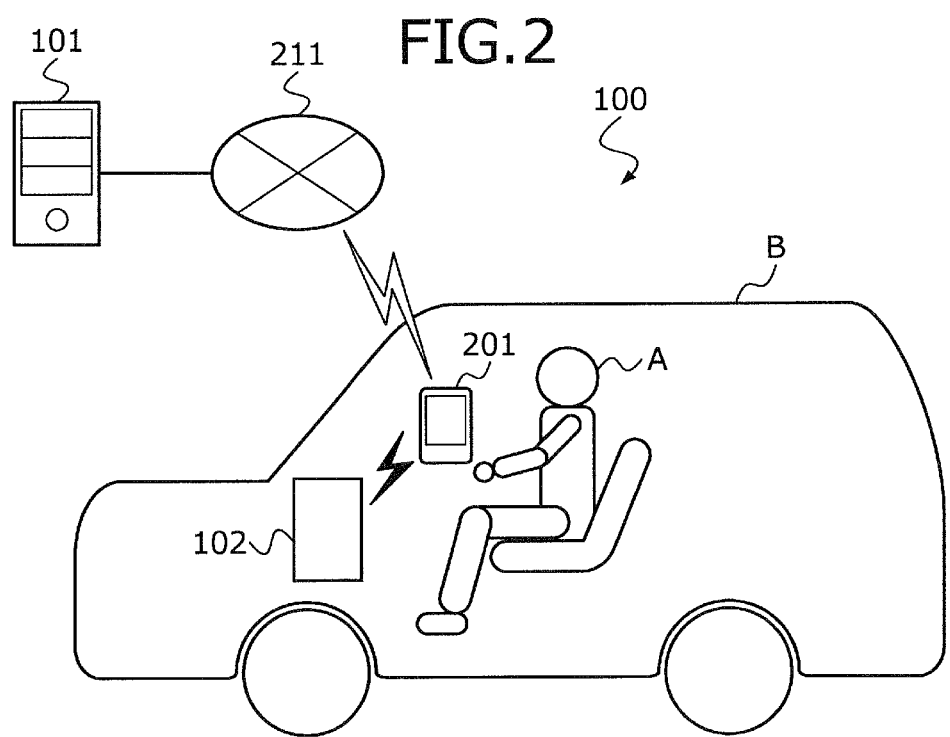
FIG. 2 is a diagram for explaining an example of connection of the communications system.

Embodiments of a communications program, a recording medium, a communications apparatus, and a communications method disclosed herein will be described below in detail with reference to the accompanying drawings. The description will be made taking a server included in a communications system according to the present embodiment as an example of the communications apparatus according to the present embodiment.

FIGS. 1A, 1B, and 1C are diagrams for explaining an example of operation of the communications system according to the present embodiment. A communications system 100 according to the present embodiment includes a server 101 and an on-vehicle device 102 acting as a communication counterpart apparatus and located in a vehicle. The server 101 and the on-vehicle device 102 mutually exchange data based on a common key encryption method. The common key encryption method is an encryption method of using key information that includes the same content, in a process of encrypting data and a process of decrypting the encrypted data. The communications system 100 according to the present embodiment will be described taking an example of a case where the communications system 100 is applied to the transmission and reception of electric control unit (ECU) information.

The server 101 stores, as a currently used common key, key information 111-1#S and identification information 112-1#S used to identify key information 111-1. The on-vehicle device 102 stores key information 111-1#C of the key and identification information 112-1#C used to identify the key information 111-. The identification information 112-1#S and 112-1#C each store therein, for example, data of "1" as information to identify the key information 111-1.

Hereinafter, concerning "#S" and "#C", information to which "#S" is attached means that the information is stored in the server 101, and information to which "#C" is attached means that the information is stored in the on-vehicle device 102. When reference numerals before "#S" and "#C" are same, this means that the information to which "#S" and "#C" are respectively attached is the same data. For example, the key information 111-1#S and 111-1#C are the same data. Data with hatching indicates encrypted data in FIGS. 1 to 31.

In FIG. 1A, the server 101 receives encrypted data 121 obtained by encrypting ECU information 120 using the key information 111-1#C, and the identification information 112-1#C from the on-vehicle device 102. After receiving the encrypted data 121, the server 101 determines from the identification information 112-1#C, whether the server 101 has stored therein identification information of the next key to be used after the identification information 112-1.

In FIG. 1B, the server 101 determines that the server 101 does not have stored therein the identification information of the next key to be used after the identification information 112-1, and obtains key information 111-2#S and the identification information 112-2#S to identify the key information 111-2. The identification information 112-2#S stores therein, for example, data of "2" as information to identify the key information 111-2.

As an obtaining method, the key information produced in advance in a storage area of the server 101 and the identification information to identify the key information may be obtained, or the key information may be produced after determining that the identification information of the next key to be used is not stored. The server 101 stores to the storage area of the server 101, the obtained key information 111-2#S, and the identification information 112-2#S to identify the key information 111-2.

In FIG. 1C, the server 101 encrypts the key information 111-2#S and the identification information 112-2#S using the key information 111-1#S, and transmits to the on-vehicle device 102, encrypted data 122 and the identification information 112-1#S.

In this manner, for any of the keys, if no key is present that is to be used next, the communications system 100 according to the present embodiment sets the next key and transmits the next key after encrypting the next key using a key, for each reception of encrypted text from the communication counterpart. The communications system 100 will be described with reference to FIGS. 2 to 31.

FIG. 2 is a diagram for explaining an example of connection of the communications system. The communications system 100 includes the server 101, the on-vehicle device 102, and a user terminal 201. The server 101 and the user terminal 201 are mutually connected by a network 211. The user terminal 201 executes wireless communication with the network 211. The user terminal 201 and the on-vehicle device 102 execute short-range wireless communication therebetween. Alternatively, the user terminal 201 and the on-vehicle device 102 may communicate by a wired connection. The on-vehicle device 102 is attached to a vehicle B. The vehicle B may be a car equipped with a motor or a two-wheel vehicle equipped with a motor. Plural on-vehicle devices 102 may be present in the communications system 100.

The server 101 is an apparatus that stores ECU information. The server 101 responds to a registration request that is for the ECU information and from the user terminal 201. The server 101 responds to a reference request that is for the ECU information and from the user terminal 201, encrypts the ECU information, and transmits the encrypted ECU information to the user terminal 201.

The on-vehicle device 102 is an apparatus that produces the ECU information related to the vehicle B. For example, the on-vehicle device 102 produces ECU information that includes the number of rotations of the motor in the vehicle B, fuel consumption, etc. The on-vehicle device 102 may include in the ECU information, the number of strokes of the wipers of the vehicle B as information related to items other than the motor.

The user terminal 201 is an apparatus that is operated by a user A. For example, the user terminal 201 issues the registration request for the ECU information by a user operation. The user terminal 201 issues the reference request for the ECU information by a user operation.

Figure 3:
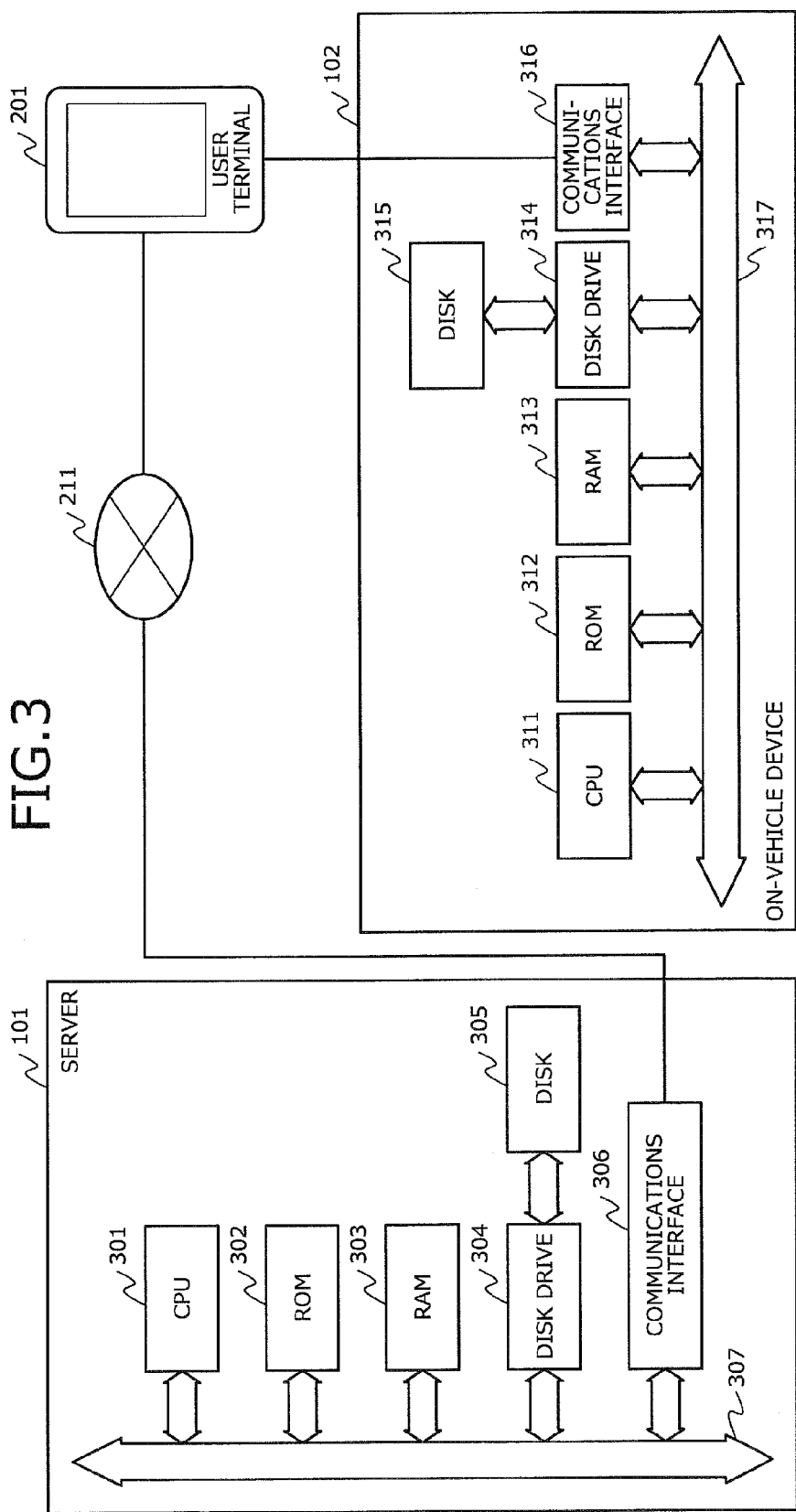
FIG. 3 is a block diagram of an example of a hardware configuration of the communications system.

FIG. 3 is a block diagram of an example of a hardware configuration of the communications system. The server 101 includes a central processing unit (CPU), read-only memory (ROM) 302, and random access memory (RAM) 303. The server 101 further includes a disk drive 304, a disk 305, and a communications interface 306. Furthermore, the CPU 301 to the communications interface 306 are connected by a bus 307, respectively.

The CPU 301 is an arithmetic processing apparatus that governs overall control of the server 101. The ROM 302 is non-volatile memory that stores programs such as a boot program. The RAM 303 is volatile memory that is used as a work area of the CPU 301.

The disk drive 304 is a control apparatus that under the control of the CPU 301, controls the reading and writing of data with respect to the disk 305. A magnetic disk drive, a solid state drive, etc. may be adopted as the disk drive 304. The disk 305 is non-volatile memory that stores data written thereto under the control of the disk drive 304. For example, when the disk drive 304 is a magnetic disk drive, a magnetic disk may be adopted as the disk 305. Further, when the disk drive 304 is a solid state drive, semiconductor memory may be adopted as the disk 305.

The communications interface 306 is a control apparatus that administers an internal interface with the network 211 and, controls the input and output of data from the network 211. More specifically, the communications interface 306 is connected, via a communications line, to the network 211, which is a local area network (LAN), a wide area network (WAN), the Internet, etc., and is connected to other apparatuses through the network 211. A modem, a LAN adapter, etc. may be adopted as the communications interface 306, for example. The server 101 may further have an optical disk drive, an optical disk, a keyboard, and a mouse.

The on-vehicle device 102 includes a CPU 311, a ROM 312, a RAM 313, a disk drive 314, a disk 315, and a communication interface 316. The CPU 311 to the communication interface 316 are connected by a bus 317, respectively.

The CPU 311 is an arithmetic processing unit that governs overall control of the on-vehicle device 102. The ROM 312 is non-volatile memory that stores programs such as a boot program. The RAM 313 is volatile memory that is used as a work area of the CPU 311.

The disk drive 314 is a control apparatus that, under the control of the CPU 311, controls the reading and writing of data with respect to the disk 315. For example, a magnetic disk drive or a solid state drive may be adopted as the disk drive 314. The disk 315 is non-volatile memory that stores the data written thereto under the control of the disk drive 314.

The communication interface 316 is a control apparatus that administers an internal interface with the network 211 and, controls input and output of data with respect to the network 211. For example, a modem or a radio LAN adaptor may be adopted as the communication interface 316. The contents stored in the server 101 and the on-vehicle 102 will be described with reference to FIGS. 4 to 7.

Figure 4:
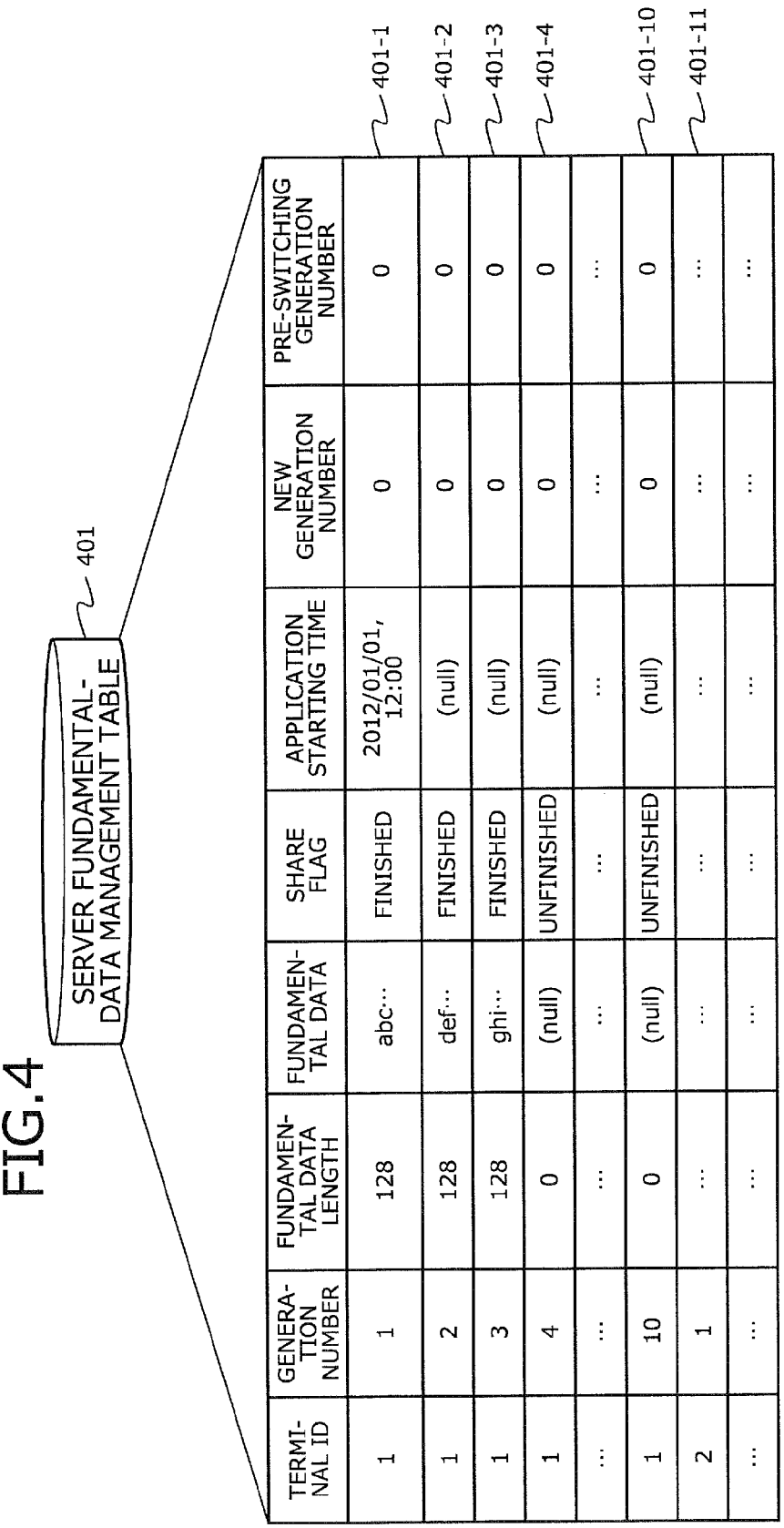
FIG. 4 is a diagram for explaining an example of the contents of a server fundamental-data management table.

FIG. 4 is a diagram for explaining an example of the contents of a server fundamental-data management table. The server fundamental-data management table 401 is a table that stores information for each key used for the on-vehicle device 102. For example, the server fundamental-data management table 401 depicted in FIG. 4 stores records 401-1 to 401-11. The server fundamental-data management table 401 is stored in the server 101.

The server fundamental-data management table 401 includes eight fields for terminal identification (ID), a generation number, a fundamental data length, fundamental data, a share flag, an application starting time, a new generation number, and a pre-switching generation number. The terminal ID field stores information that uniquely identifies the on-vehicle device 102. The generation number field stores information that uniquely identifies a key to encrypt the ECU information. The fundamental data length field stores the data length of the fundamental data to be the production source of the key. The fundamental data field stores the fundamental data that is to be the production source of the key. When no fundamental data is present that is to be the production source of the key, the fundamental data field stores "(null)". The fundamental data may be any value while the fundamental data is, for example, data produced from a random number.

The share flag field stores an identifier that indicates whether the given fundamental data stored in the fundamental data field is shared with the on-vehicle device 102. For example, the share flag field has either a "completion" identifier indicating that the given fundamental data is shared between the server 101 and the on-vehicle device 102, or an "incompletion" identifier indicating that the given fundamental data is not shared with the on-vehicle device 102. The application starting time field stores the time at which the given fundamental data is first used. For example, the application starting time field stores the time at which a message is first received from the on-vehicle device 102 after the fundamental data is switched to the given fundamental data. If the given fundamental data has not yet been used, the application starting time field stores "(null)".

The new generation number field stores the generation number of the fundamental data to be used next after the given fundamental data. When no fundamental data is present that is to be used next, the new generation number field stores "0". The pre-switching generation number field stores the generation number of the fundamental data used before the given fundamental data. If no previously used fundamental data is present, the pre-switching generation number field stores "0".

For example, the record 401-1 represents information related to the key used for communication with the on-vehicle device 102 whose terminal ID is "1". For example, the record 401-1 indicates that: the generation number of the key produced from the fundamental data "abc . . . " is "1"; the fundamental data length of the key is 128 bits; the key is shared with the on-vehicle device 102; and the key is used starting at 12:00 on Jan. 1, 2012.

Figure 5:
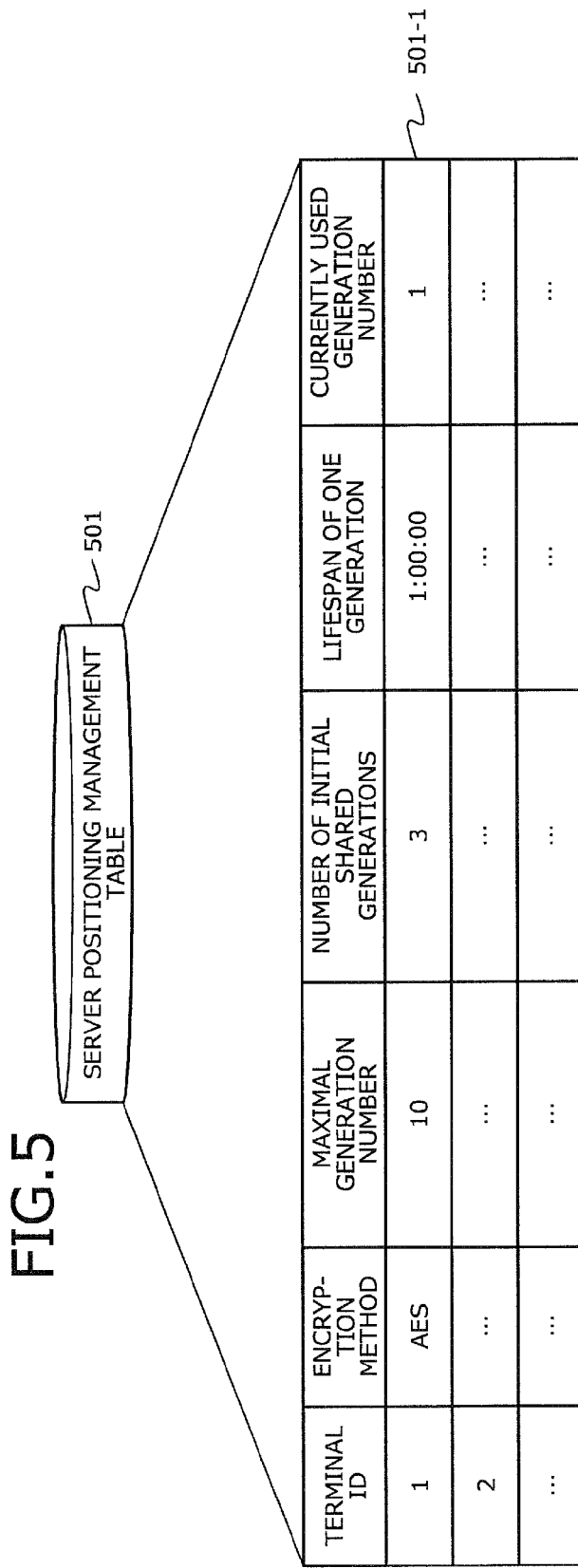
FIG. 5 is a diagram for explaining an example of the contents of a server positioning management table.

FIG. 5 is a diagram for explaining an example of the contents of a server positioning management table. The server positioning management table 501 indicates for each on-vehicle device 102, information related to the key currently used by the on-vehicle device 102, among the plural keys. The server positioning management table 501 is stored in the server 101.

The server positioning management table 501 includes six fields for the terminal ID, the encryption method, the maximal generation number, the number of initial shared generations, the lifespan of one generation, and the currently used generation number. The terminal ID field stores information that uniquely identifies the on-vehicle device 102. The encryption method field stores the name of the encryption method. For example, the encryption method field stores "triple DES", which represents a triple DES according to which the data encryption standard (DES) is repeated for three times in order of encryption, decryption, and encryption; and further stores "AES", which represents an advanced encryption standard (AES).

The "maximal generation number" field stores the maximal number of key information stored. The "number of initial shared generations" field stores the number of keys that are shared in an initial registration process. The "lifespan of one generation" field stores the time period that elapses from the start of the use of one key to the end thereof. The "currently used generation number" field stores the generation number of the key currently used by the on-vehicle device 102.

For example, the record 501-1 indicates information related to the key that is to be used for communication with the on-vehicle device 102 whose terminal ID is "1". For example, the record 501-1 indicates that: the encryption method is the AES; up to 10 keys are stored; three keys are stored in the initial registration process; the lifespan of one key is one hour; and the generation number of the currently used key is "1".

Figure 6:
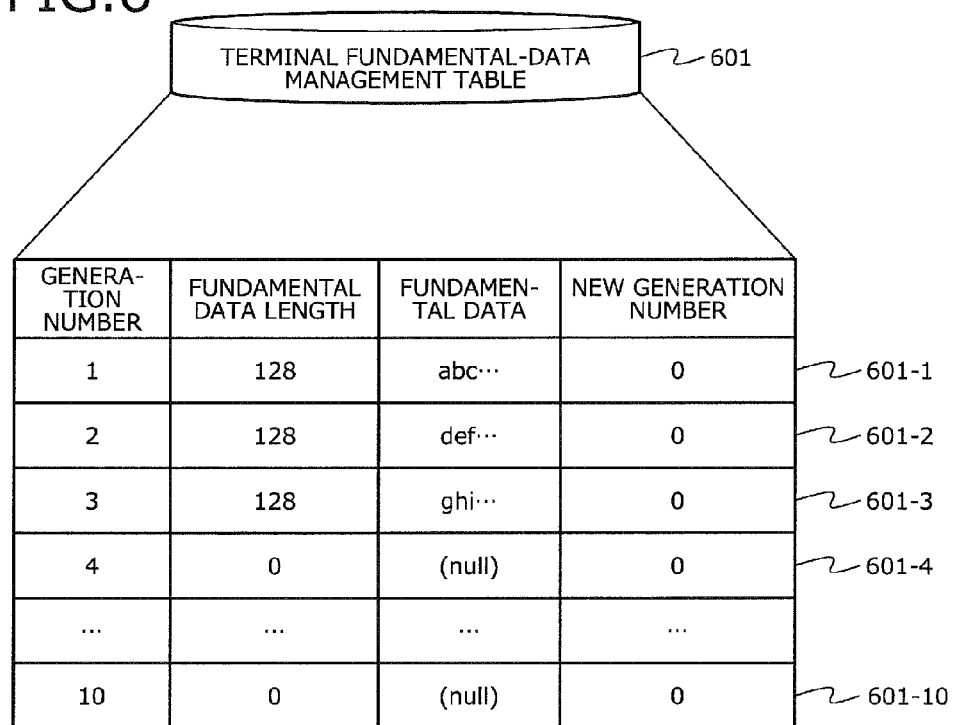
FIG. 6 is a diagram for explaining an example of the contents of a terminal fundamental-data management table.

FIG. 6 is a diagram for explaining an example of the contents of the terminal fundamental-data management table. The terminal fundamental-data management table 601 is a table that stores information related to each key used for the on-vehicle device 102. For example, the terminal fundamental-data management table 601 depicted in FIG. 6 stores records 601-1 to 601-10. The terminal fundamental-data management table 601 is stored in the on-vehicle device 102.

The terminal fundamental-data management table 601 includes four fields for the generation number, the fundamental data length, the fundamental data, and the new generation number, respectively. The four fields from the generation number field to the new generation number field have the same definitions as those of the fields having the same names of the server fundamental-data management table 401 and therefore, will not again be described.

Figure 7:
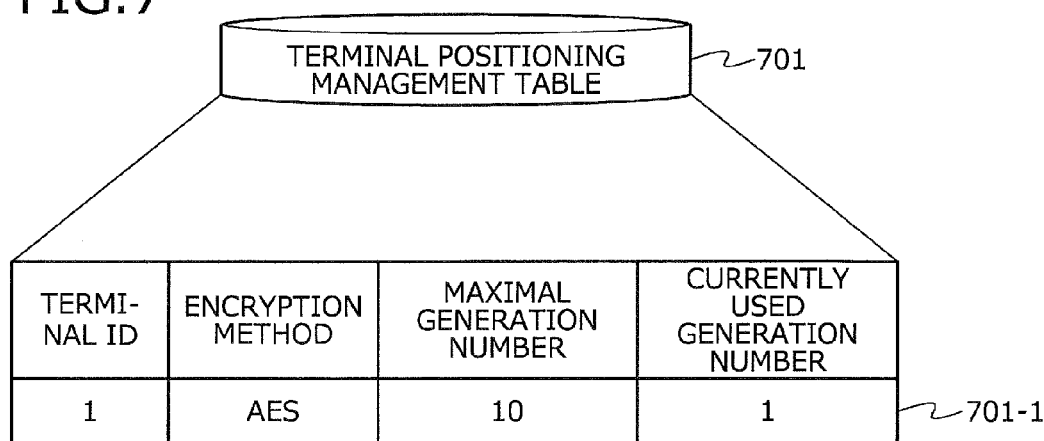
FIG. 7 is a diagram for explaining an example of the contents of a terminal positioning management table.

FIG. 7 is a diagram for explaining an example of the contents of a terminal positioning management table. The terminal positioning management table 701 indicates information related to the key currently used by the on-vehicle device 102 among the plural keys. For example, the terminal positioning management table 701 stores a record 701-1. The terminal positioning management table 701 is stored in the on-vehicle device 102.

The terminal positioning management table 701 includes four fields for the terminal ID, the encryption method, the maximal generation number, and the currently used generation number, respectively. The four fields from the terminal ID field to the currently used generation number field have the same definitions as those of the fields having the same names of the server positioning management table 501 and therefore, will not again be described.

Figure 8:
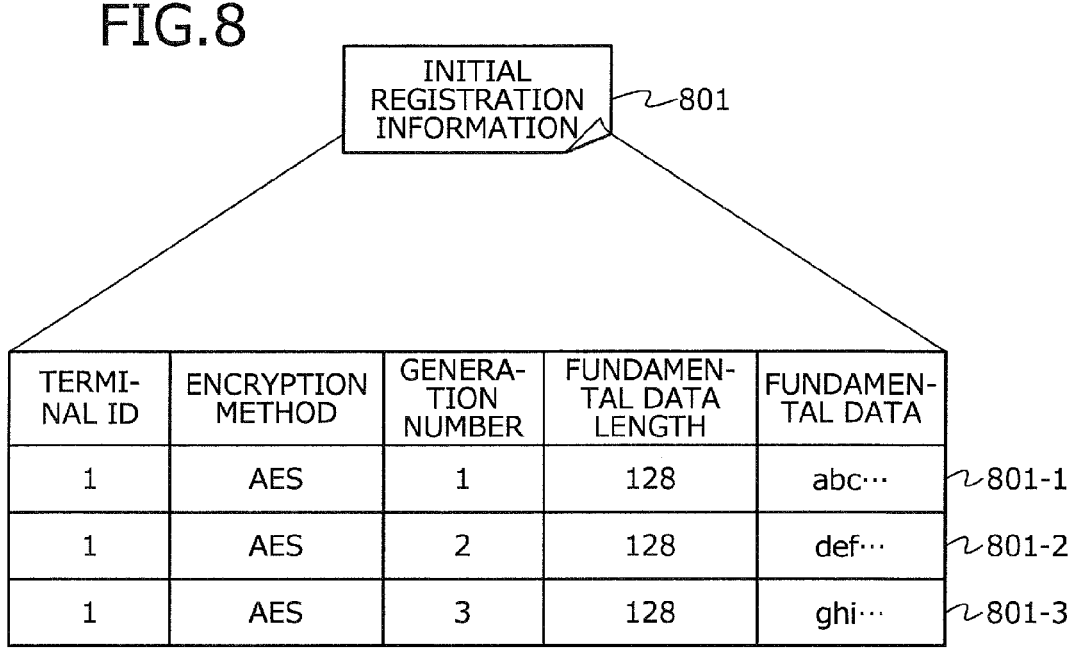
FIG. 8 is a diagram for explaining an example of the contents of initial registration information by an initial registration process.

FIG. 8 is a diagram for explaining an example of the contents of initial registration information by the initial registration process. FIG. 8 depicts an example of the contents of initial registration information 801 to be output when the initial registration process comes to an end. For example, the initial registration information 801 depicted in FIG. 8 stores records 801-1 to 801-3.

The initial registration information 801 includes five fields for the terminal ID, the encryption method, the generation number, the fundamental data length, and the fundamental data. The five fields from the terminal ID field to the fundamental data field have the same definitions as those of the fields having the same names of the server fundamental-data management table 401 and the server positioning management table 501 and, therefore, will not again be described.

Figure 9:
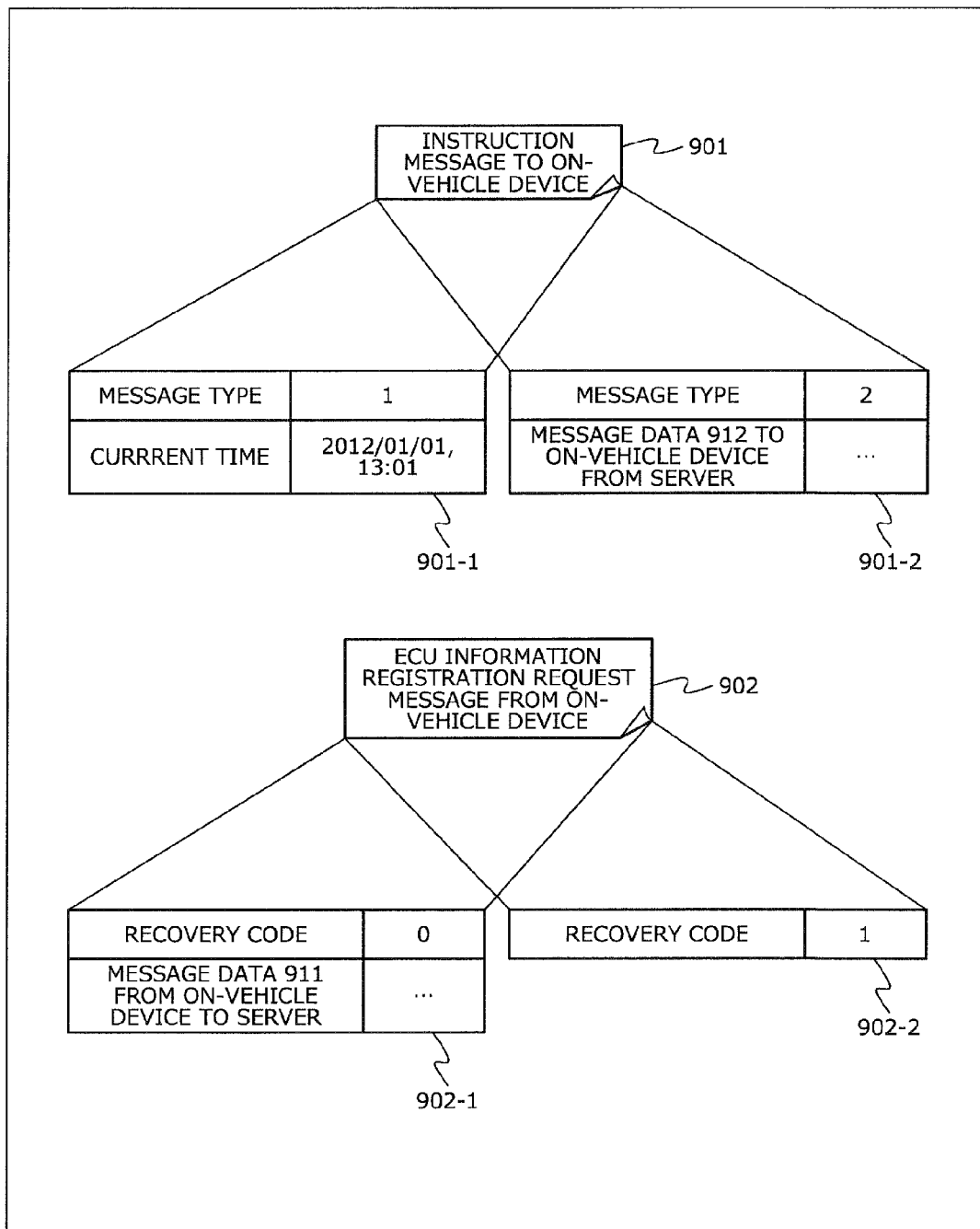
FIG. 9 is a diagram for explaining an example of a message format of the communications system.

FIG. 9 is a diagram for explaining an example of a message format of the communications system. In the communications system 100 according to the present embodiment, messages of the server 101 and the on-vehicle device 102 are mutually transmitted and received using two formats of an instruction message 901 to the on-vehicle device and an ECU information registration request message 902 from the on-vehicle device.

The instruction message 901 to the on-vehicle device includes a message type field, as a head field. The instruction message 901 to the on-vehicle device includes a succeeding field that differs corresponding to the value of the message type. When the message type is "1" indicating the "ECU information registration request message", the instruction message 901 to the on-vehicle device includes a current time field, as a second field. The current time field stores the time at which the user terminal 201 relays a message.

When the message type is "2" indicating a "response message reception instruction", the instruction message 901 to the on-vehicle device includes a field having message data 912 to the on-vehicle device from the server, as the second field. The message data 912 will be described later with reference to FIG. 11.

For example, an instruction message 901-1 to the on-vehicle device indicates that the message type thereof is "1"; and the time at which the user terminal 201 relays the instruction message 901-1 to the on-vehicle device is 13:01 on Jan. 1, 2012. An instruction message 901-2 to the on-vehicle device indicates that the message type thereof is "2"; and the message data 912 is retained thereby.

The ECU information registration request message 902 includes a recovery code field, as the head field. The ECU information registration request message 902 includes a field that stores the message data 911 from the on-vehicle device to the server, as the second field. The recovery code field stores "0" when the ECU information registration request is normally executed. If an error is detected and the ECU information registration request cannot be produced, error code is stored in the field. If the value in the recovery code field is not "0", the field having the message data 911 is invalid. The message data 911 will be described later with reference to FIG. 10.

For example, the ECU information registration request message 902-1 indicates that the recovery code is "0"; and the message data 911 is retained thereby. The ECU information registration request message 902-2 indicates that the recovery code is "1".

Figure 10:
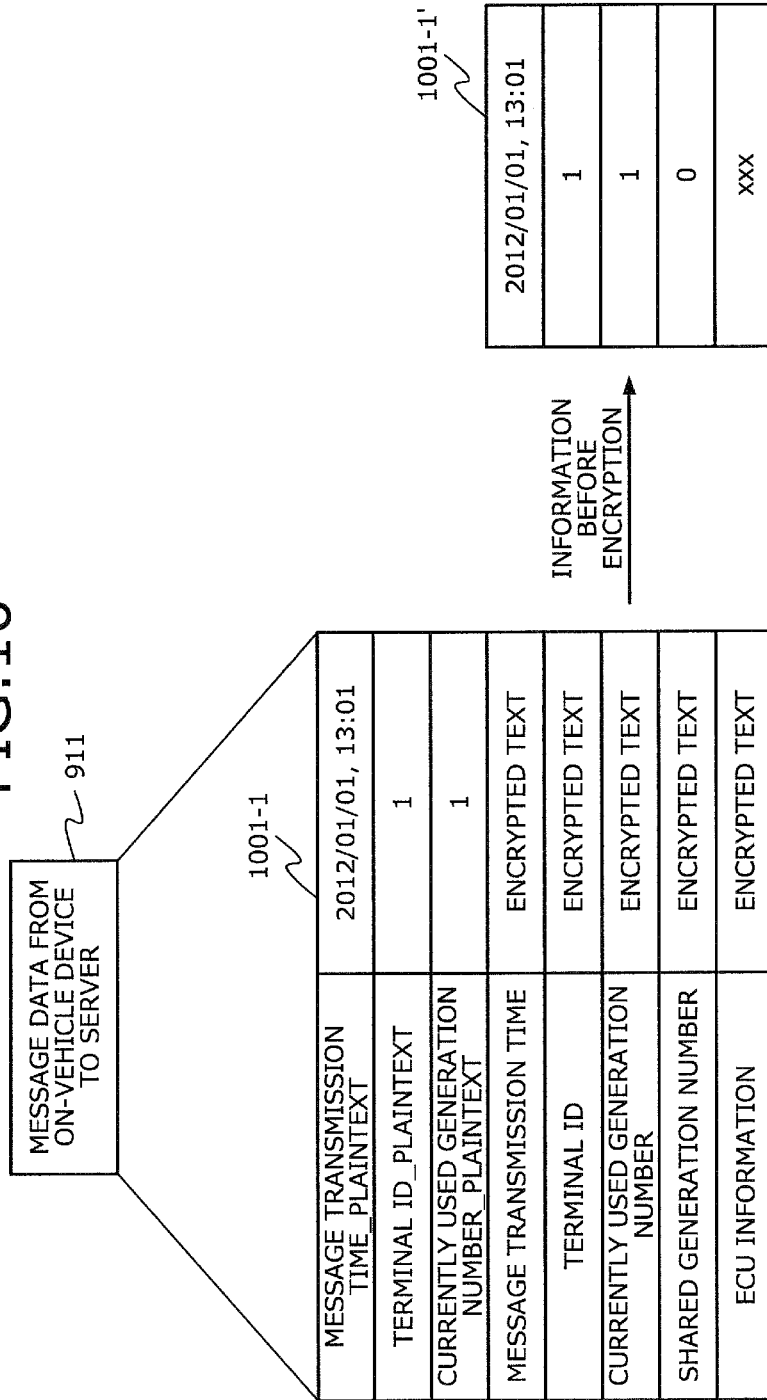
FIG. 10 is a diagram for explaining an example of a format of message data from an on-vehicle device to a server.

FIG. 10 is a diagram for explaining an example of a format of the message data from the on-vehicle device to the server. The message data 911 includes eight fields for the message transmission time_plaintext, the terminal ID_plaintext, the currently used generation number_plaintext, the message transmission time, the terminal ID, the currently used generation number, the shared generation number, and the ECU information. The on-vehicle device 102 encrypts the fields from the message transmission time field to the ECU information field using a key produced from the fundamental data designated by the currently used generation number_plaintext. The on-vehicle device 102 may encrypt each field at one at a time among the fields from the message transmission time field to the ECU information field, or may encrypt the values of the fields from the message transmission time field to the ECU information field as a single unit of data.

The message transmission time_plaintext field stores the transmission time of the target message. The terminal ID_plaintext field stores the terminal ID of the on-vehicle device 102 that is the transmission source of the message. The currently used generation number_plaintext field stores the generation number of the currently used key. The message transmission time field stores the same value as the value in the message transmission time_plaintext field. The terminal ID field stores same value as the value in the terminal ID_plaintext field. The currently used generation number field stores the same value as the value in the currently used generation number_plaintext field.

The shared generation number field stores the generation number of the key newly shared with the server 101. For example, the shared generation number field stores the value of the new generation number field of the message data 912 from the on-vehicle device from the server, received from the user terminal 201 before the message is transmitted. If the message data 912 has not yet been received, or if the value is "0" in the new generation number field of the message data 912, the shared generation number field stores "0". The ECU information field stores the ECU information.

For example, message data 1001-1 is data whose transmission time is 13:01 on Jan. 1, 2012, that is produced by the on-vehicle device 102 having the terminal ID of "1", and that is encrypted using the key having the generation number corresponds to "1". Information 1001-1' that is the information before the encryption of the message data 1001-1 indicates that no key is newly shared with the server 101 and that the ECU information is "xxx".

Figure 11:
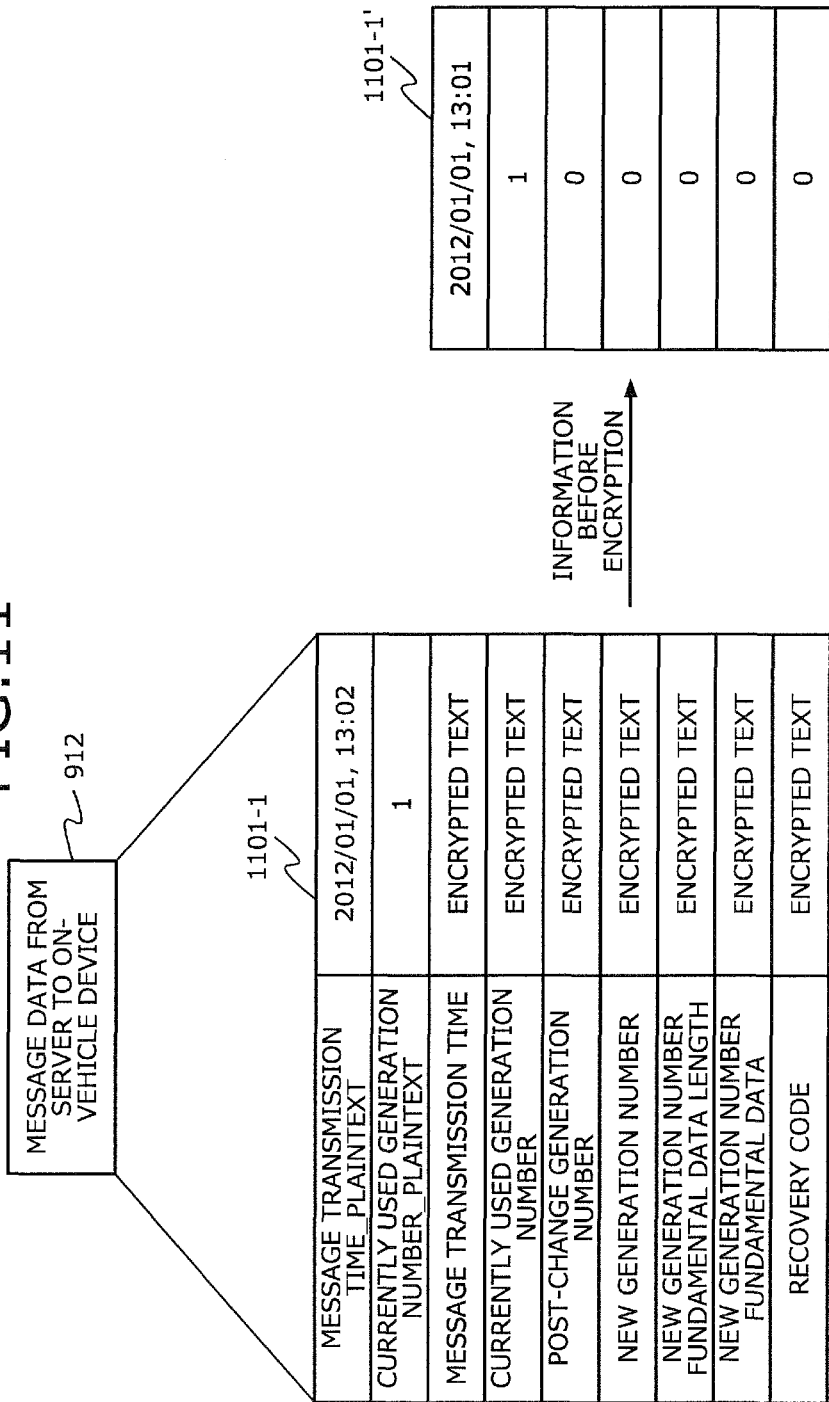
FIG. 11 is a diagram for explaining an example of a format of the message data from the server to the on-vehicle device.

FIG. 11 is a diagram for explaining an example of a format of the message data from the server to the on-vehicle device. The message data 912 includes nine fields for the message transmission time_plaintext, the currently used generation number_plaintext, the message transmission time, the currently used generation number, the post-change generation number, the new generation number, the new generation number fundamental data length, the new generation number fundamental data, and the recovery code. The server 101 encrypts the fields from the message transmission time field to the recovery code field using the key produced from the fundamental data designated by the currently used generation number_plaintext. The server may encrypt each field at one at a time among the fields from the message transmission time field to the recovery code field or may encrypt the values of the fields from the message transmission time field to the recovery code field as a single unit of data.

The message transmission time_plaintext field stores the transmission time of the target message. The currently used generation number_plaintext field stores the terminal ID of the on-vehicle device 102 to be the transmission counterpart of the target message. The message transmission time field stores the same value as the value in the transmission time field of the target message. The currently used generation number field stores the generation number of the currently used key. The post-change generation number field stores the generation number of the currently used key if the lifespan of the currently used generation number of the message has already expired. If the lifespan of the currently used generation number of the message has not yet expired, the post-change generation number field stores "0".

The new generation number field stores the generation number of the key newly shared with the on-vehicle device 102. When no newly shared key is present, the new generation number field stores "0". For example, a state where the newly shared key is present is established, is a case where the post-change generation number field stores a value other than "0" and a message encrypted using the value of the post-change generation number field is received from the on-vehicle device 102 according to the message before the given message.

A value other than "0" is not stored in either the post-change generation number field or the new generation number field. Hereinafter, a message for which a value other than "0" is set in the post-change generation number field will be referred to as "post-change generation number setting message", and a message for which a value other than "0" is set in the new generation number field will be referred to as "new generation number setting message".

The new generation number fundamental data length field stores the data length of the fundamental data of the newly shared key. The new generation number fundamental data field stores the fundamental data of the newly shared key. The recovery code field stores the code that indicates the process result for the ECU information registration request.

For example, message data 1101-1 is data whose transmission time is 13:02 on Jan. 1, 2012, that is transmitted to the on-vehicle device 102 whose terminal ID is "1", and that is encrypted by the key whose generation number corresponds to "1". Information 1101-1', which is the information before the encryption of the message data 1011-1, indicates that both the post-change generation number field and the new generation number field each stores "0".

Figure 12:
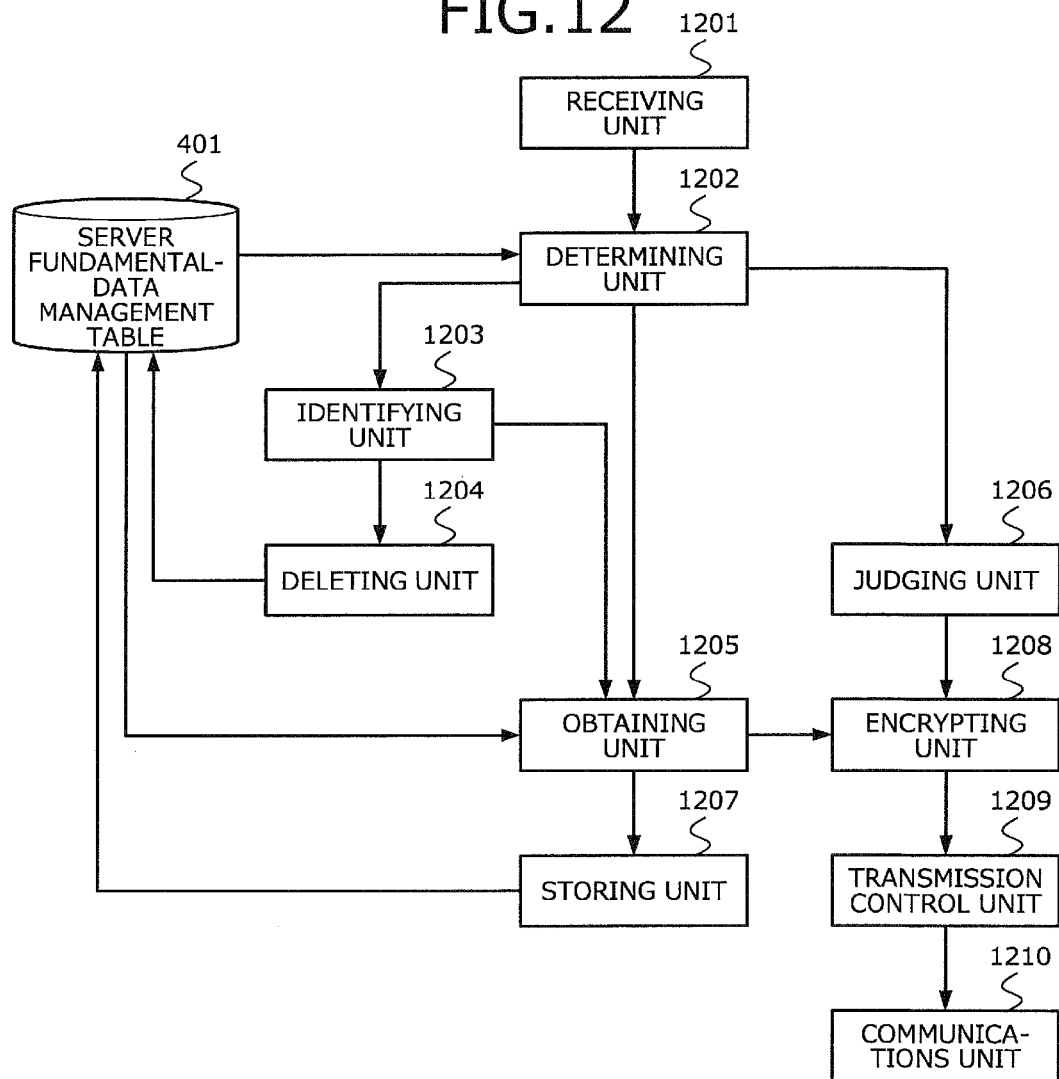
FIG. 12 is a block diagram of an example of functions of the server.

Functions of the server 101 will be described. FIG. 12 is a block diagram of an example of functions of the server. The server 101 includes a receiving unit 1201, a determining unit 1202, an identifying unit 1203, a deleting unit 1204, an obtaining unit 1205, a judging unit 1206, a storing unit 1207, an encrypting unit 1208, a transmission control unit 1209, and a communications unit 1210. Functions of the receiving unit 1201 to the transmission control unit 1209 forming a control unit are implemented by executing on the CPU 301, programs stored in a storage apparatus. The storage apparatus is, for example, a ROM 302, a RAM 303, or a disk 305 depicted in FIG. 3. Alternatively, the functions of the units from the receiving unit 1201 to the transmission control unit 1209 may be realized by execution by another CPU through the communication interface 306.

The communications unit 1210 may be the communication interface 306 or may include a device driver that controls operations of the communication interface 306. The device driver is stored in the storage apparatus, and controls the operation of the communication interface 306 by being executed by the CPU 301.

The server 101 can access the server fundamental-data management table 401. The server fundamental-data management table 401 stores for each of the plural keys, the key information of the key and the identification information of the key. The server fundamental-data management table 401 is stored in a storage apparatus such as the RAM 303 or the disk 305.

The receiving unit 1201 receives from a communication counterpart apparatus, encrypted data encrypted using the key information of a key among the plural keys used in the common key encryption method, and the identification information of the key. The key information of the key may be the common key itself or may be the data of the production source of the common key. In the present embodiment, the key information is the fundamental data, which is the production source of the common key. The receiving unit 1201 may receive the encrypted data, and the identification information of the key from the communications unit 1210. The receiving unit 1201 may regularly refer to a buffer into which the communications unit 1210 writes the encrypted data and the identification information of the key. The received data is stored in the storage area such as the RAM 303 or the disk 305.

The determining unit 1202 refers to the server fundamental-data management table 401, and determines whether identification information is stored that is of a next key to be used next after the key and correlated with the identification information of a given key. For example, the determining unit 1202 determines whether the identification information of the next key to be used after the key whose generation number is "1" is stored correlated with a key whose generation number is "1". The identification information of the next key to be used is stored in the new generation number field of the server fundamental-data management table 401. The determining unit 1202 determines that the identification information of the next key to be used is not stored if the value in the new generation number field is "0", and determines that the identification information of the next key to be used is stored if the value is a value other than "0". The determination result is stored to a storage area such as the RAM 303 or the disk 305.

If the determining unit 1202 determines that the identification information of the next key to be used is not stored, the identifying unit 1203 identifies the previous key used by the communication counterpart apparatus before the given key, based on the storage content of the server fundamental-data management table 401. For example, the identifying unit 1203 identifies the previous key by using the generation number field and the new generation number field of the server fundamental-data management table 401.

For example, it is assumed that the server fundamental-data management table 401 stores such records as a first record whose generation number field has therein a value of "1" and whose new generation number field has therein a value of "2", and a second record whose generation number field has therein a value of "2" and whose new generation number field has therein a value of "0". It is also assumed that, because the value in the new generation number field is "0", the determining unit 1202 determines that the identification information is not stored of the next key to be used after the key that corresponds to the generation number of "2". In this case, the identifying unit 1203 detects the first record whose new generation number field has the generation number of "2" set therein. The identifying unit 1203 identifies, as the previous key, the key that corresponds to the generation number of "1". The identifying unit 1203 may identify the key used before the previous key by repeating the above process or may identify the key used before the two previous keys by tracing back further. The identification information of the identified key is stored to a storage area such as the RAM 303 or the disk 305.

The deleting unit 1204 deletes among the plural keys stored in the server fundamental-data management table 401, the key information of a previous key identified by the identifying unit 1203 and the identification information of the previous key. For example, the deleting unit 1204 deletes the key information and the identification information of the key that corresponds to the identified generation number of "1".

If the determining unit 1202 determines that the identification information of the next key to be used is not stored, the obtaining unit 1205 obtains the key information of another key that is different from a key stored in the server fundamental-data management table 401, and the identification information of the other key. For example, if the determining unit 1202 determines that the identification information of the key that corresponds to the generation number of "2" is not stored, the obtaining unit 1205 obtains the key information of a key that corresponds to the generation number of "3", which is different from the key that corresponds to the generation number of "2" among the plural keys, and further obtains the identification information of the key that corresponds to the generation number of "3". The obtained identification information of the key is stored to a storage area such as the RAM 303 or the disk 305.

The obtaining unit 1205 may obtain the key information of another key that is different from a key stored in the server fundamental-data management table 401 and a key identified by the identifying unit 1203, and the identification information of the other key. For example, it is assumed that the determining unit 1202 determines that the identification information of the key that corresponds to the generation number of "2" is not stored and the identifying unit 1203 identifies, as the previous key, the key that corresponds to the generation number of "1". In this case, the obtaining unit 1205 obtains the key information of a key that corresponds to the generation number of "3", which is different from the key that corresponds to the generation number of "2" and the key that corresponds to the generation number of "1" among the plural keys, and further obtains the identification information of the key that corresponds to the generation number of "3". The obtained data is stored to a storage area such as the RAM 303 or the disk 305.

If the determining unit 1202 determines that the identification information of the next key to be used is stored, the judging unit 1206 judges whether a key is valid based on the elapsed time from the time when the key is first used or a count of the number of times the key is used. For example, if one hour or more elapses from the time when a key is first used, the judging unit 1206 judges that the key is invalid. Alternatively, if a key is used for encryption 100 times or more, the judging unit 1206 judges that the key is invalid.

The judging unit 1206 may make the judgment based on the elapsed time from the time when a key is first used by the server 101, or may make the judgment based on the elapsed time from the time when a key is first used by the on-vehicle device 102. The same is true for the number of times. The judging unit 1206 may make the judgment based on the number of times a key is used by the server 101, or may make the judgment based on the number of times a key is used by the on-vehicle device 102. The judging unit 1206 may judge based on the number of times a key is used by the server 101 and the on-vehicle device 102. The obtained data is stored to a storage area such as the RAM 303 or the disk 305.

The storing unit 1207 stores the identification information of the other key obtained by the obtaining unit 1205, correlating the identification information with the identification information of a key stored in the server fundamental-data management table 401. For example, the storing unit 1207 stores the identification information of the key that corresponds to the generation number of "2" obtained by the obtaining unit 1205, correlating the identification information with the identification information of the key that corresponds to the generation number of "1".

The encrypting unit 1208 encrypts the key information and the identification information of the other key obtained by the obtaining unit 1205, using the key information of a key stored in the server fundamental-data management table 401. For example, the encrypting unit 1208 encrypts the key information of the key that corresponds to the generation number of "2" to be used next and the identification information of the key that corresponds to the generation number of "2", using the key information of the key that corresponds to the generation number of "1".

If the judging unit 1206 judges that a key is invalid, the encrypting unit 1208 may encrypt the identification information of the next key to be used, using the key information of a key stored in the server fundamental-data management table 401. For example, the encrypting unit 1208 encrypts the identification information of the key that corresponds to the generation number of "2" to be used next using the key information of the key that corresponds to the generation number of "1". The encrypted data is stored to a storage area such as the RAM 303 or the disk 305.

The communication control unit 1209 controls the communications unit 1210 and thereby, transmits to the communication counterpart apparatus, the identification information of the next key to be used encrypted by the encrypting unit 1208 and the identification information of a key. For example, the transmission control unit 1209 transmits to the on-vehicle device 102, the encrypted key information of the key that corresponds to the generation number of "2" to be used next, the encrypted identification information of the key that corresponds to the generation number of "2", and the identification information of the key corresponding to the generation number of "1".

The transmission control unit 1209 may control the communications unit 1210 and thereby, may transmit to the communication counterpart apparatus, the identification information of the next key to be used encrypted by the encrypting unit 1208 and the identification information of a key. For example, the transmission control unit 1209 transmits to the on-vehicle device 102, the identification information of the key that corresponds to the generation number of "2" encrypted using the key information of the key that corresponds to the generation number of "1".

The communications unit 1210 communicates with the on-vehicle device 102. The communications unit 1210 may communicate with the on-vehicle device 102 through the user terminal 201. The server 101 may include a transmitting unit that includes the communications unit 1210 and the communication control unit 1209. With reference to FIGS. 13 to 16, the processing executed for the ECU information registration will be described using the contents of the server fundamental-data management table 401, the server positioning management table 501, the terminal fundamental-data management table 601, and the terminal positioning management table 701. The ECU information registration request is issued by application software executed on the user terminal 201. Hereinafter, the application software will be referred to as "app".

Figure 13:
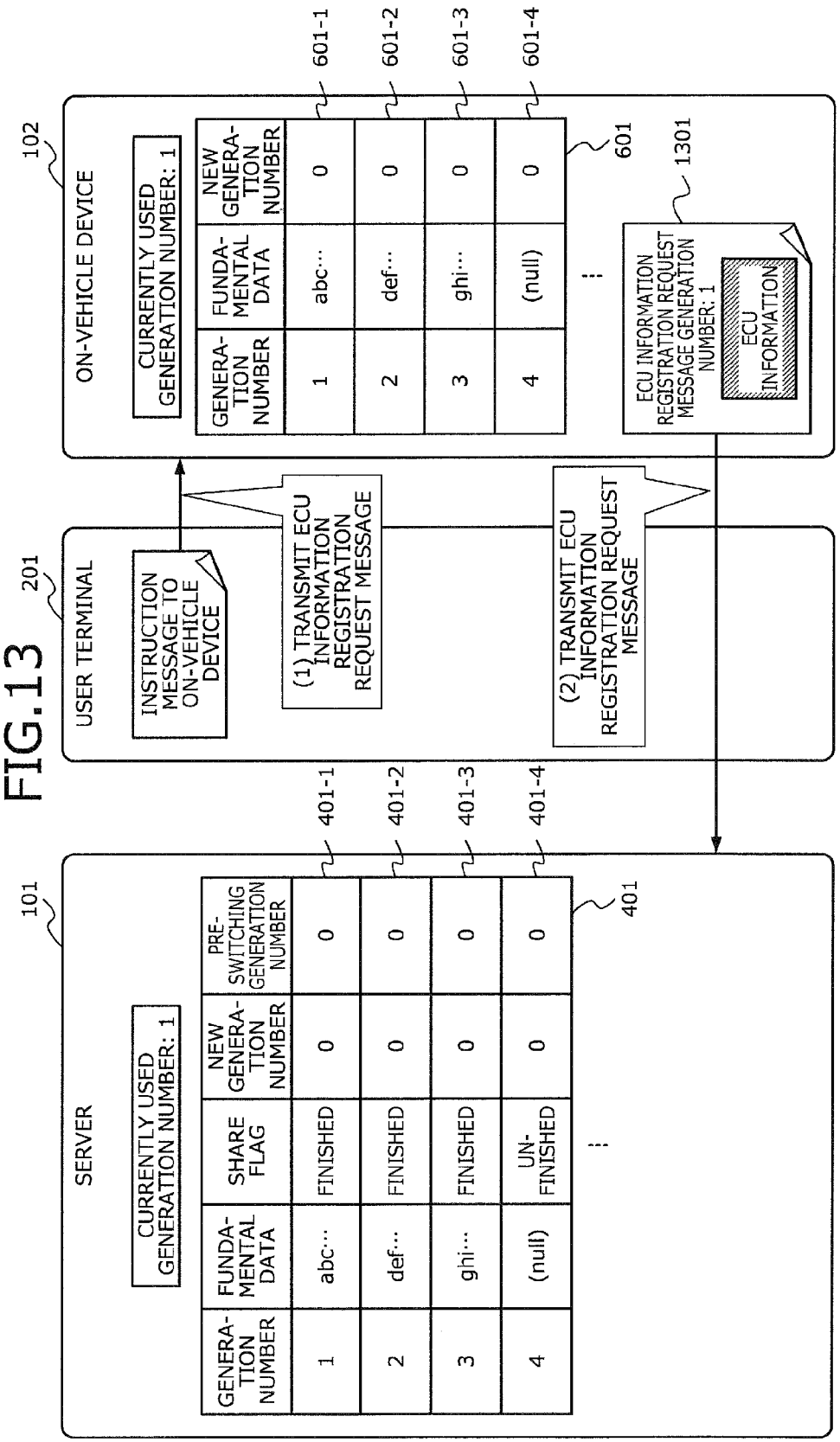
FIG. 13 is a diagram for explaining an example of operation executed for ECU information registration.

FIG. 13 is a diagram for explaining an example of operation executed for the ECU information registration. The currently used generation number is "1" for the server 101 and the on-vehicle device 102. In this state, as a first (1) process, the user terminal 201 transmits to the on-vehicle device 102, an instruction ECU information registration request message to the on-vehicle device whose message type has "ECU information registration request message" set therein. After receiving the instruction message to the on-vehicle device, as a second (2) process, the on-vehicle device 102 produces an ECU information registration request message 1301 that includes the ECU information and encrypts the ECU information registration request message 1301, using the key produced from the fundamental data designated by the generation number of "1". The on-vehicle device 102 transmits the encrypted ECU information registration request message 1301 to the server 101, through the user terminal 201. The ECU information registration request message 1301 complies with the format of the ECU information registration request message 902.

Figure 14:
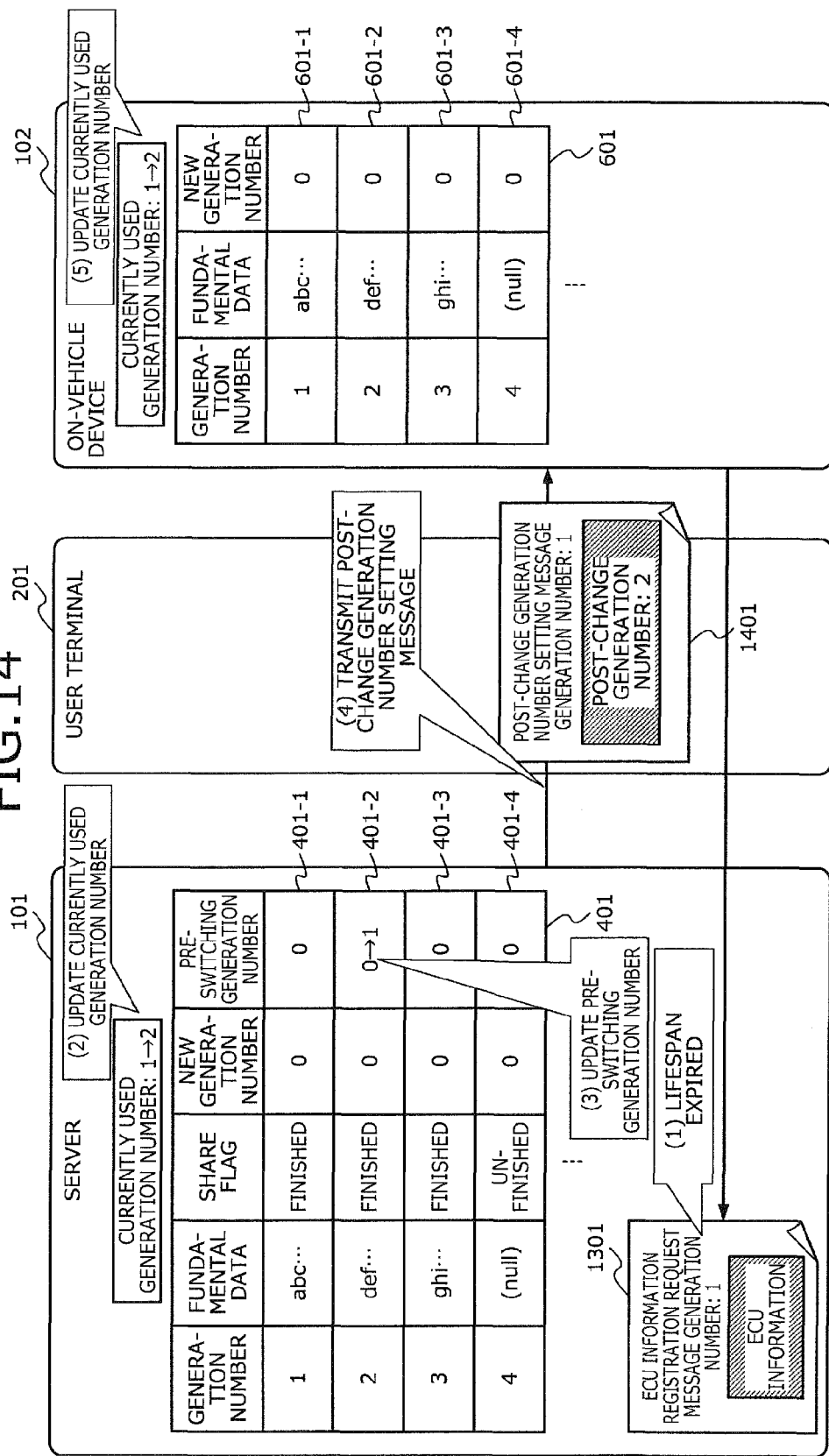
FIG. 14 is a diagram for explaining an example of operation executed for key generation number updating.

FIG. 14 is a diagram for explaining an example of operation executed for key generation number updating. The state of the communications system 100 depicted in FIG. 14 is the state after the second (2) process depicted in FIG. 13 comes to an end. As a first (1) process, the server 101 determines whether the lifespan has already expired of the key designated by the generation number of "1" in the received ECU information registration request message 1301. If the server 101 determines that the lifespan of the key has not yet expired, the server 101 decrypts the ECU information registration request message 1301, registers the ECU information, and transmits to the on-vehicle device 102, a response message giving notification that the ECU information can be registered normally.

If the server 101 determines that the lifespan of the key has already expired, as a second (2) process, the server 101 selects any of the records whose share flag fields each have therein a value indicating "finished" in addition to the currently used generation number, and updates the currently used generation number field with the new currently used generation number. In the example of FIG. 14, the server 101 selects a record 401-2 from among the records 401-2 and 401-3 whose generation number fields each have therein a value other than "1" and whose share flag field values each indicate "completion", and updates the currently used generation number field with "2".

As a third (3) process, the server 101 sets in the pre-switching generation number field of the selected record, the generation number that has been set. In the example of FIG. 14, the server 101 updates the pre-switching generation number field of the record 401-2 from "0" to "1". As a fourth (4) process, the server 101 encrypts, using the key information designated by the generation number of "1", a post-change generation number setting message 1401 whose post-change generation number is "2" and transmits the encrypted message to the on-vehicle device 102, through the user terminal 201. The post-change generation number setting message 1401 follows the format of the instruction message 901 to the on-vehicle device.

After receiving the post-change generation number setting message 1401, as a fifth (5) process, the on-vehicle device 102 updates the currently used generation number field with the currently used generation number in the post-change generation number setting message 1401. In the example of FIG. 14, the on-vehicle device 102 updates the currently used generation number field from "1" to "2".

Figure 15:
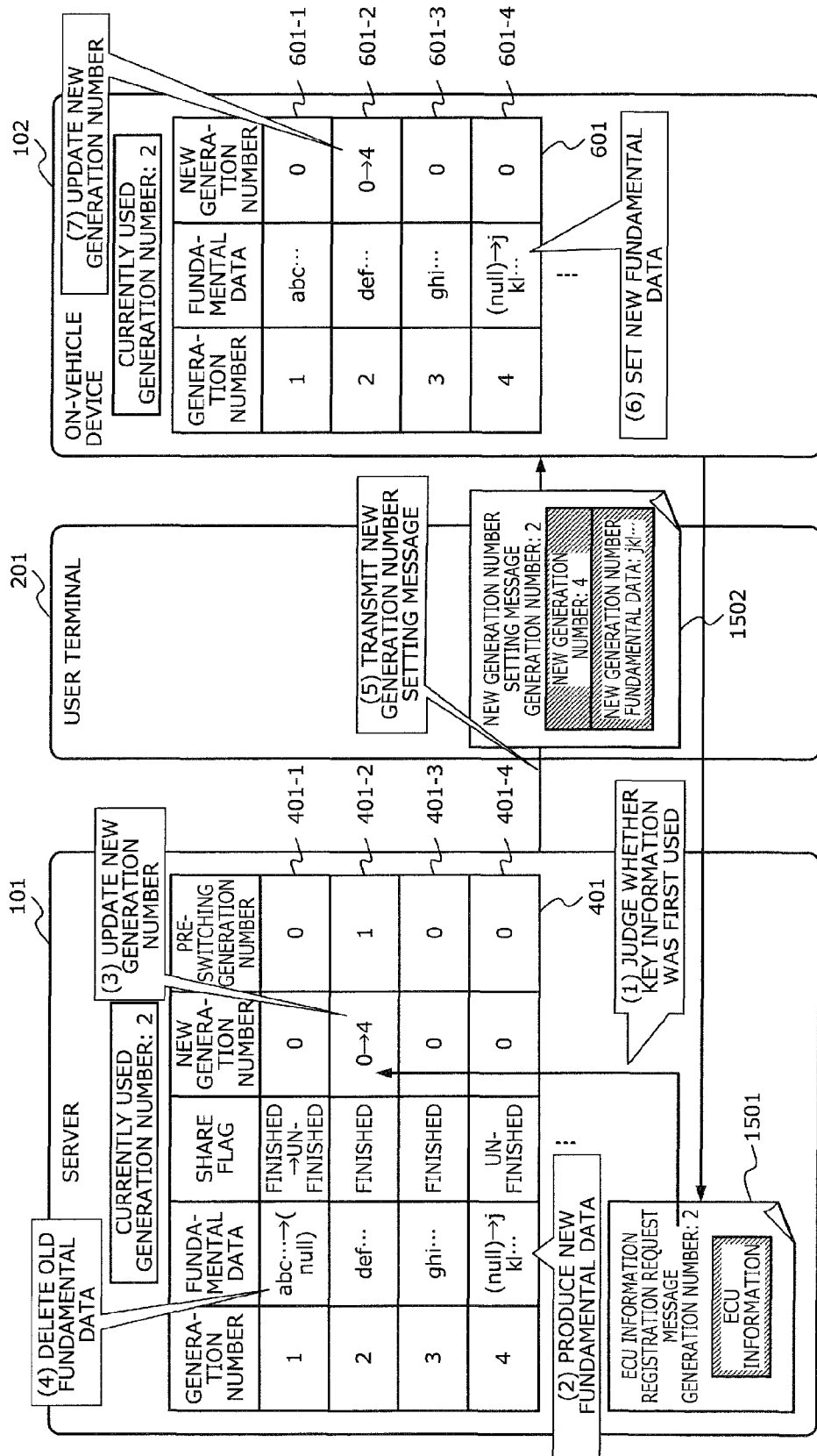
FIG. 15 is a diagram for explaining an example of operation executed for sharing fundamental data of a new generation number between the server and the on-vehicle device.

FIG. 15 is a diagram for explaining an example of operation executed for sharing the fundamental data of the new generation number between the server and the on-vehicle device. The state of the communications system 100 depicted in FIG. 15 is the state after the fifth (5) process depicted in FIG. 14 comes to an end. The server 101 receives an ECU information registration request message 1501 that is encrypted using the key information designated by the generation number of "2" and produced by the on-vehicle device 102. The ECU information registration request message 1501 follows the format of the ECU information registration request message 902.

As a first (1) process, the server 101 judges whether the key information used for the encryption of the ECU information registration request message 1501 is first used for encryption. To determine whether the key information is first used for encryption, the server 101 searches the server fundamental-data management table 401, for a record having the same value as that in the currently used generation number_plaintext field of the ECU information registration request message 1501. The server 101 determines whether the new generation number field of the record retrieved by the search has "0" therein. If the server 101 determines that the new generation number field has "0" therein, this means that the key information designated by the corresponding generation number is first used for encryption.

In the example of FIG. 15, the value is "0" in the new generation number field of the record 401-2 whose generation number field has "2" set therein and therefore, the server 101 determines that the key information designated by the generation number of "2" is first used for encryption. If any key information is present that is first used for encryption, as a second (2) process, the server 101 produces new fundamental data, and sets the new fundamental data in the fundamental data field of the record whose share flag field has "unfinished" therein. In the example of FIG. 15, the server 101 produces new fundamental data "jkl . . . " and sets the new fundamental data "jkl . . . " in the fundamental data field of a record 401-4.

As a third (3) process, the server 101 sets the generation number of the record having the new fundamental data set therein, in the new generation number field of the record indicated by the currently used generation number in the server fundamental-data management table 401. In the example of FIG. 15, the server 101 sets "4" in the new generation number field of the record 401-2.

As a fourth (4) process, the server 101 searches for a record whose generation number field has the same value set therein as that of the pre-switching generation number of the record designated by the currently used generation number in the server fundamental-data management table 401. The server 101 deletes the fundamental data of the record retrieved by the search. The server 101 sets "unfinished" in the share flag of the retrieved record. In the example of FIG. 15, the server 101 deletes the fundamental data "abc . . . " of the record 401-1 and sets "unfinished" in the share flag field of the record 401-1.

As a fifth (5) process, the server 101 encrypts, using the key information designated by the generation number of "2", a new generation number setting message 1502 whose new generation number is "4" and transmits the encrypted message 1502 to the on-vehicle device 102, through the user terminal 201. The new generation number fundamental data field of the new generation number setting message 1502 stores the new fundamental data "jkl . . . ". The new generation number setting message 1502 follows the format of the ECU information registration request message 901.

After receiving the new generation number setting message 1502, as a sixth (6) process, the on-vehicle device 102 searches for a record whose generation number field has therein the same value as that of the new generation number field of the new generation number setting message 1502 in the terminal fundamental-data management table 601. The on-vehicle device 102 stores to the fundamental data field of the record retrieved by the search, the value stored in the new generation number fundamental data field of the new generation number setting message 1502. In the example of FIG. 15, the on-vehicle device 102 stores "jkl . . . " in the fundamental data field of the record 601-4.

As a seventh (7) process, the on-vehicle device 102 sets the value in the new generation number field of the new generation number setting message 1502, into the new generation number field of the record indicated by the currently used generation number in the terminal fundamental-data management table 601. In the example of FIG. 15, the on-vehicle device 102 updates the new generation number field of the record 601-2 from "0" to "4".

Figure 16:
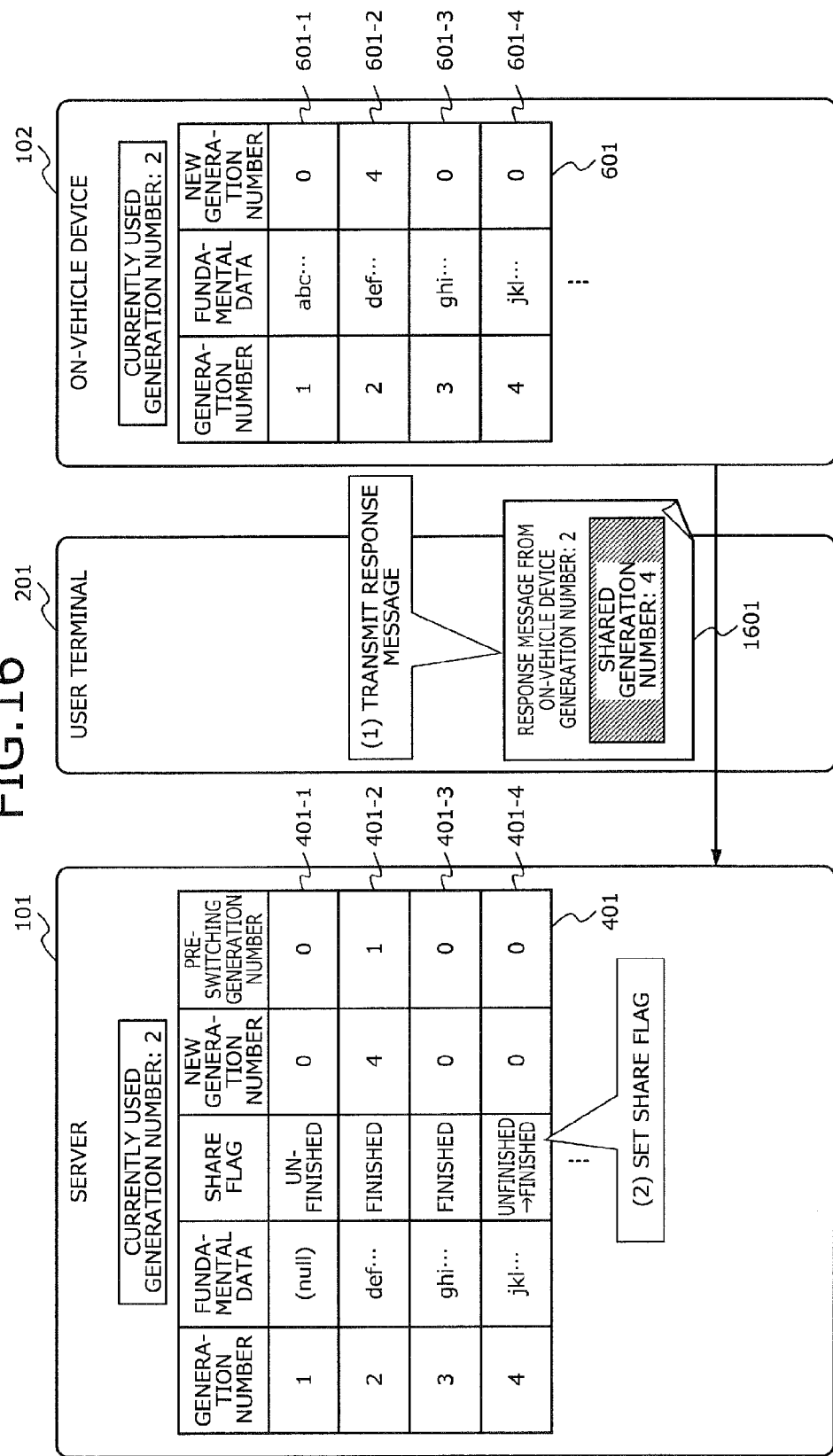
FIG. 16 is a diagram for explaining an example of operation executed for transmission to the server of "sharing finished" of the fundamental data of the new generation number.

FIG. 16 is a diagram for explaining an example of operation executed for transmission to the server of "sharing finished" of the fundamental data of the new generation number. The state of the communications system 100 depicted in FIG. 16 is the state after the seventh (7) process depicted in FIG. 15 comes to an end.

As a first (1) process, the on-vehicle device 102 transmits an ECU information registration request message 1601 whose shared generation number field has "4" stored therein and that is encrypted using the key information designated by the generation number of "2". The ECU information registration request message 1601 complies with the format of the ECU information registration request message 902.

After receiving the ECU information registration request message 1601, as a second (2) process, the server 101 searches the server fundamental-data management table 401, for a record whose generation number field has the same value set therein as that in the shared generation number field of the ECU information registration request message 1601. The server 101 sets the share flag of the record retrieved by the search to be "finished". In the example of FIG. 16, the server 101 sets "finished" in the share flag field of the record 401-4. Flowcharts for executing the operations depicted in FIGS. 13 to 16 will be described with reference to FIGS. 17 to 31.

Figure 17:
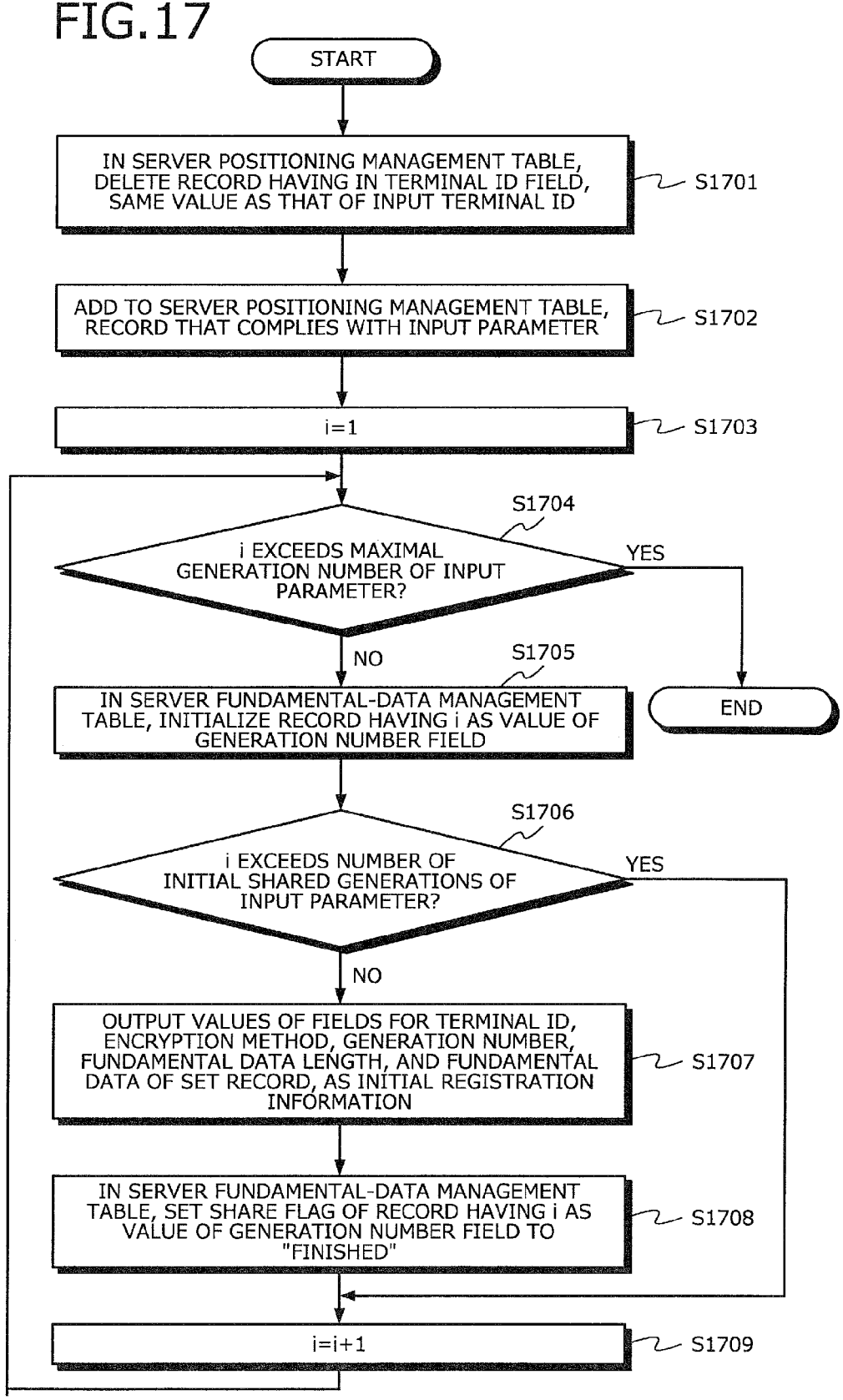
FIG. 17 is a flowchart of an example of a procedure for an initial registration process executed by the server.

FIG. 17 is a flowchart of an example of a procedure for the initial registration process executed by the server. The initial registration process executed by the server is a process of registering the key information into the server 101. The execution of the initial registration process executed by the server is started by an operation by the development engineer of the user terminal 201, at the start of the operation of the communications system 100. In the initial registration process executed by the server, the values of the terminal ID, the encryption method, the number of initial shared generations, the maximal generation number, and the lifespan of one generation are received via operational input by the development engineer of the user terminal 201.

The server 101 deletes a record whose terminal ID field has the same value set therein as that of the input terminal ID in the server positioning management table 501 (step S1701). The server 101 adds to the server positioning management table 501, a record that complies with an input parameter (step S1702). The server 101 sets "1" to be the currently used generation number of the added record. The server 101 sets "1" to be a variable "i" used as a counter for the generation number (step S1703).

The server 101 determines whether the variable i is greater than the maximal generation number of the input parameter (step S1704). If the server 101 determines that the variable i is equal to or smaller than the maximal generation number of the input parameter (step S1704: NO), the server 101 initializes the record whose value in the generation number field is the variable i, in the server fundamental-data management table (step S1705). The server 101 sets the fields in the record as follows, as the initialization.

The server 101 sets the terminal ID of the input parameter in the terminal ID field of the record. The server 101 sets the variable i in the generation number field of the record. The server 101 sets a value produced from a random number in the fundamental data field of the record. The server 101 sets the data length of the value set in the fundamental data field, in the fundamental data length field of the given record. The server 101 sets "incompletion" in the share flag field of the record. The server 101 sets "(null)" to be the application starting time of the record. The server 101 sets "0" in each of the new generation number field and the pre-switching generation number field of the record.

After the initialization comes to an end, the server 101 determines whether the variable i is greater than the number of initial shared generations of the input parameter (step S1706). If the server 101 determines that the variable i is less than or equal to the number of initial shared generations of the input parameter (step S1706: NO), the server 101 outputs the values of the fields for the terminal ID, the encryption method, the generation number, the fundamental data length, and the fundamental data of the set record, as the initial registration information 801 (step S1707). The server 101 sets "finished" in the share flag of the record whose value in the generation number field is i, of the server fundamental-data management table 401 (step S1708). After the operation at step S1706 comes to an end or if the server 101 determines that the variable i is greater than the number of initial shared generations of the input parameter (step S1706: YES), the server 101 increments the variable i (step S1709). After the operation at step S1709 comes to an end, the server 101 advances to the operation at step S1704.

If the server 101 determines that the variable i is greater than the maximal generation number of the input parameter (step S1704: YES), the server 101 causes the initial registration process executed by the server to come to an end. The execution of the initial registration process executed by the server enables the communications system 100 to set the key information used at the start of the operation, in the server 101.

Figure 18:
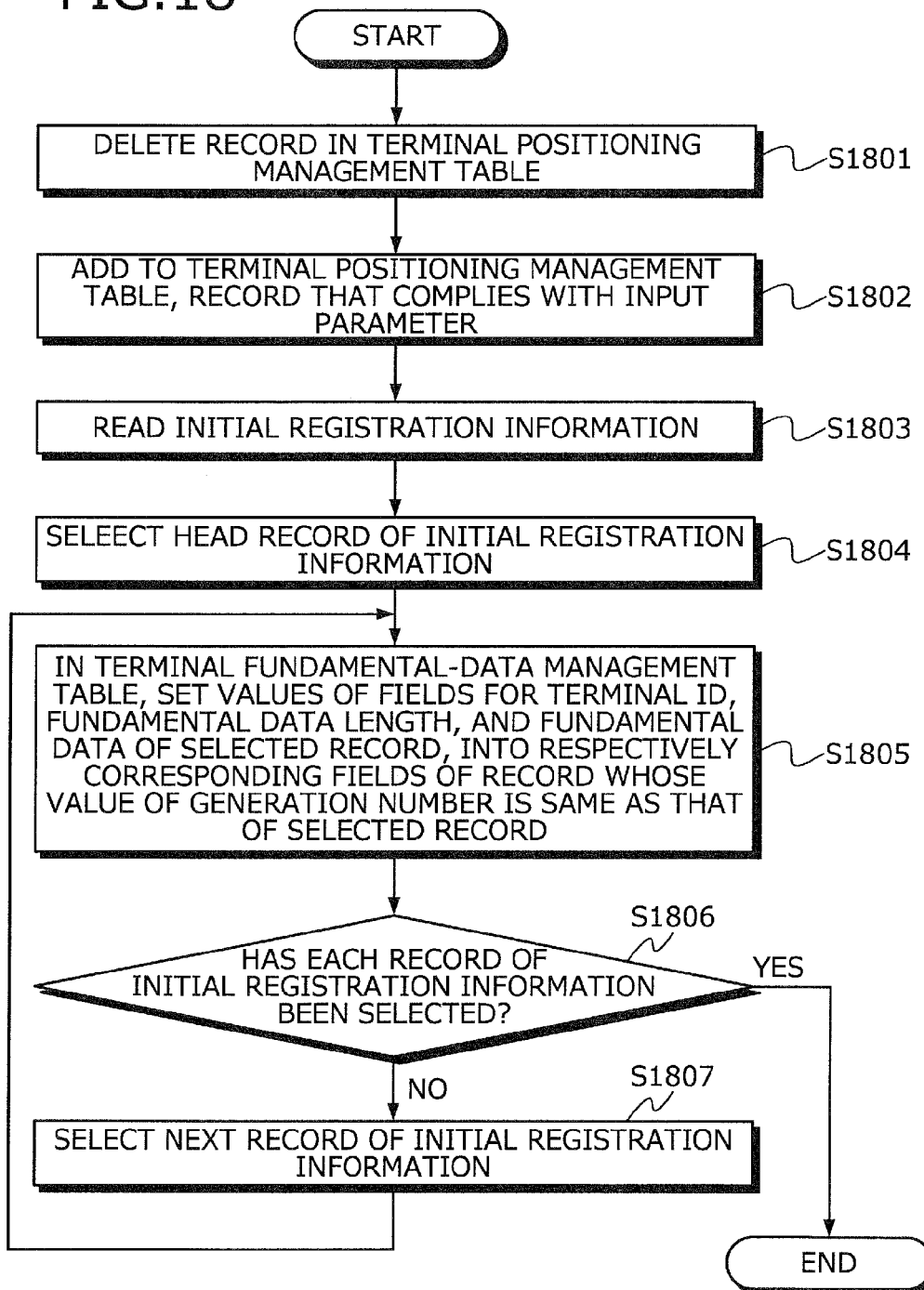
FIG. 18 is a flowchart of an example of a procedure for the initial registration process executed by the on-vehicle device.

FIG. 18 is a flowchart of an example of a procedure for the initial registration process executed by the on-vehicle device. The initial registration process executed by the on-vehicle device is a process of reading the initial registration information 801 output in the initial registration process executed by the server, and registering the key information into the on-vehicle device 102. The execution of the initial registration process executed by the on-vehicle device is started by an operation by the development engineer of the user terminal 201, at the start of the operation of the communications system 100. In the initial registration process executed by the on-vehicle device, the terminal ID, the maximal generation number, and the initial registration information 801 are received by operational input by the development engineer of the user terminal 201.

The on-vehicle device 102 deletes a record in the terminal positioning management table 701 (step S1801). The on-vehicle device 102 adds to the terminal positioning management data 701, a record that complies with the input parameter (step S1802). The on-vehicle device 102 reads the initial registration information 801 (step S1803). The on-vehicle device 102 selects the record at the head of the read initial registration information 801 (step S1804).

The on-vehicle device 102 sets the values of the fields for the terminal ID, the fundamental data length, and the fundamental data of the selected record, into the respectively corresponding fields of the record whose value of the generation number is same as that of the selected record, in the terminal fundamental-data management table 601 (step S1805). The on-vehicle device 102 sets "0" in the new generation number field. The on-vehicle device 102 determines whether the on-vehicle device 102 has selected each of the records in the initial registration information 801 (step S1806). If the on-vehicle device 102 determines that an unselected record is still present (step S1806: NO), the on-vehicle device 102 selects the next record in the initial registration information 801 (step S1807). After the operation at step S1807 comes to an end, the on-vehicle device 102 advances to the operation at step S1805.

If the on-vehicle device 102 determines that the on-vehicle device 102 has selected each of the records (step S1806: YES), the on-vehicle device 102 causes the initial registration process executed by the on-vehicle device to come to an end. The initial registration process executed by the on-vehicle device enables the communications system 100 to set the key information used at the start of the operation in the on-vehicle device 102.

Figure 19:
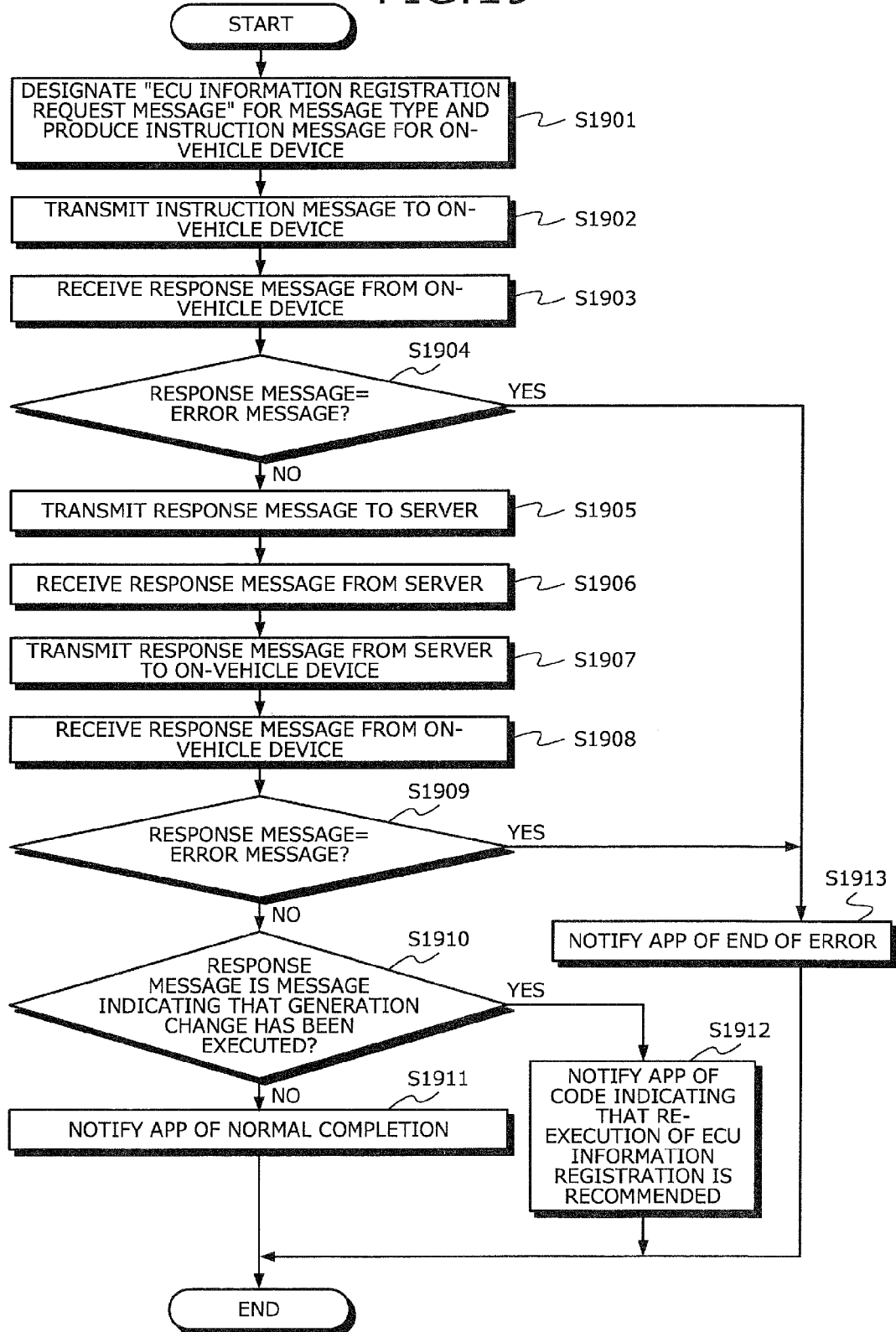
FIG. 19 is a flowchart of an example of a procedure for a message process executed by a user terminal.

FIG. 19 is a flowchart of an example of a procedure for the message process executed by the user terminal. In the message process executed by the user terminal, a process is executed for a response message given by the server 101 and the on-vehicle device 102.

The user terminal 201 designates the "ECU information registration request message" for the message type and produces the instruction message 901 for the on-vehicle device, according to the ECU information registration request by an app on the user terminal 201 (step S1901). The user terminal 201 transmits to the on-vehicle device 102, the instruction message 901 for the on-vehicle device (step S1902). The user terminal 201 receives a response message from the on-vehicle device 102 (step S1903).

The user terminal 201 determines whether the response message is an error message (step S1904). If the user terminal 201 determines that the response message is not an error message (step S1904: NO), the user terminal 201 transmits a response message (the ECU information registration request message) to the server 101 (step S1905). The user terminal 201 receives a response message from the server 101 (step S1906). The user terminal 201 transmits the response message from the server 101, to the on-vehicle device 102 (step S1907). The user terminal 201 receives a response message from the on-vehicle device 102 (step S1908).

The user terminal 201 determines whether the response message is an error message (step S1909). If the user terminal 201 determines that the response message is not an error message (step S1909: NO), the user terminal 201 determines whether the response message is a message indicating that a generation change has been executed (step S1910).

If the user terminal 201 determines that the response message is not a message indicating that a generation change has been executed (step S1910: NO), the user terminal 201 notifies the app of normal completion (step S1911). If the user terminal 201 determines that the response message is a message indicating that a generation change has been executed (step S1910: YES), the user terminal 201 notifies the app of code indicating that re-execution of the ECU information registration is recommended (step S1912). If the user terminal 201 determines that the response message is an error message (step S1904: YES, step S1909: YES), the user terminal 201 notifies the app of the end of the error (step S1913). After the operations at steps S1911, S1912, and S1913 come to an end, the user terminal 201 causes the message process executed by the user terminal to come to an end. The message process executed by the user terminal enables the communications system 100 to execute the ECU information registration.

Figure 20:
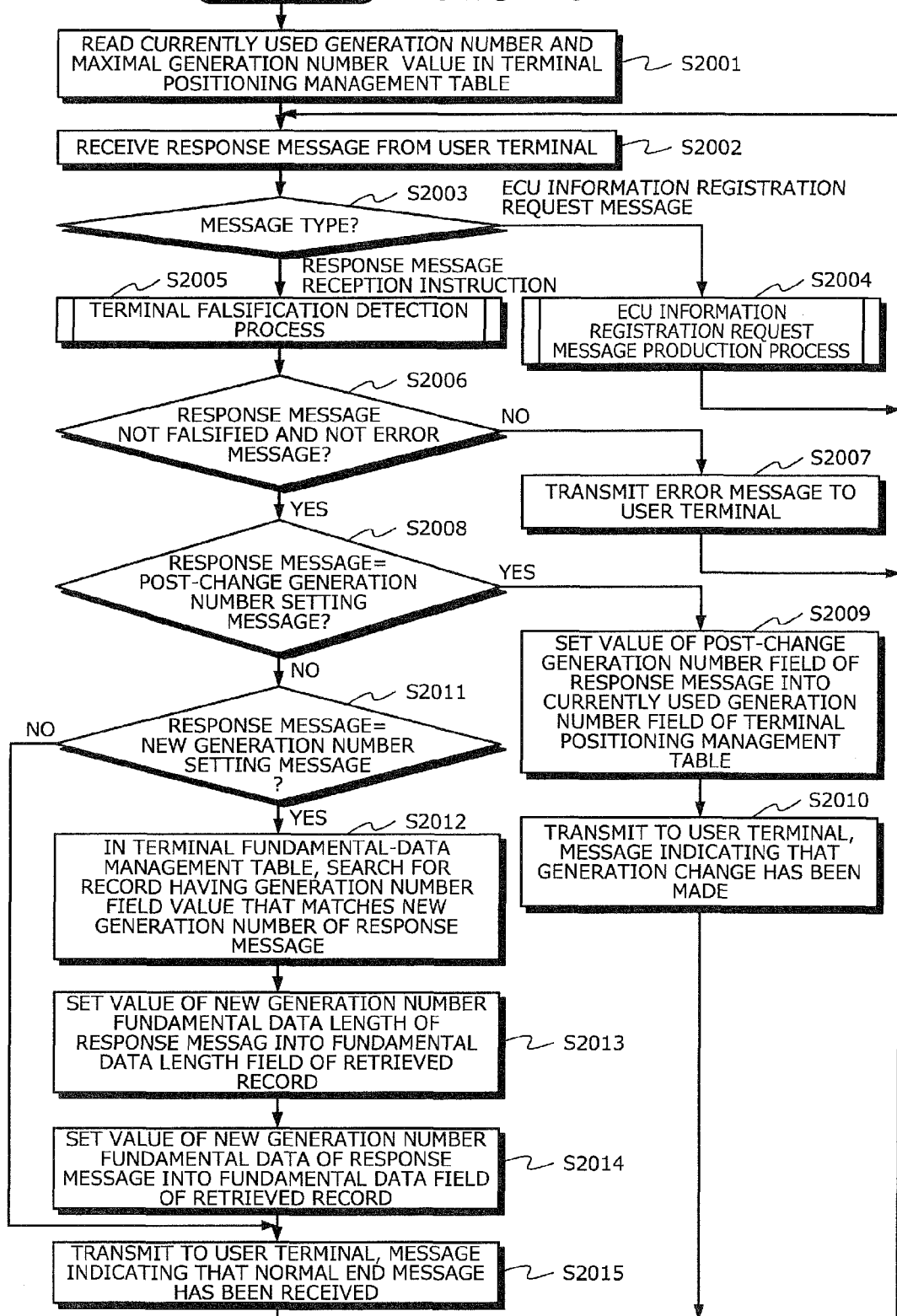
FIG. 20 is a flowchart of an example of a procedure for a process executed by the on-vehicle device for a response message from the server.

FIG. 20 is a flowchart of an example of a procedure for a process executed by the on-vehicle device for the response message from the server. The response message process executed by the on-vehicle device is a process executed for the response message from the server, received from the user terminal 201. The on-vehicle device 102 reads the currently used generation number and the maximal generation number in the terminal positioning management table 701 (step S2001). The on-vehicle device 102 receives from the user terminal 201, a response message that is from the server (step S2002). The response message from the server at step S2002 complies with the format of the instruction message 901 to the on-vehicle device. The on-vehicle device 102 checks the message type of the received instruction message to the on-vehicle device (step S2003).

If the on-vehicle device 102 recognizes the message type of the instruction message to the on-vehicle device as an ECU information registration request message (step S2003: ECU INFORMATION REGISTRATION REQUEST MESSAGE), the on-vehicle device 102 executes an ECU information registration request message production process (step S2004). Details of the ECU information registration request message production process will be described later with reference to FIG. 21. After the ECU information registration request message production process comes to an end, the on-vehicle device 102 advances to the operation at step S2002.

If the on-vehicle device 102 recognizes the message type of the instruction message to the on-vehicle device as the response message reception instruction (step S2003: RESPONSE MESSAGE RECEPTION INSTRUCTION), the on-vehicle device 102 executes a terminal falsification detection process (step S2005). The terminal falsification detection process will be described later with reference to FIG. 23. The on-vehicle device 102 determines whether the response message from the server is not falsified and is not an error message (step S2006). If the on-vehicle device 102 determines that the response message from the server is falsified or that the response message is an error message (step S2006: NO), the on-vehicle device 102 transmits an error message to the user terminal 201 (step S2007). After the operation at step S2007 comes to an end, the on-vehicle device 102 advances to the operation at step S2002.

If the on-vehicle device 102 determines that the response message from the server is not falsified and the response message is not an error message (step S2006: YES), the on-vehicle device 102 determines whether the response message from the server is a post-change generation number setting message (step S2008). If the on-vehicle device 102 determines that the response message from the server is a post-change generation number setting message (step S2008: YES), the on-vehicle device 102 sets the value in the post-change generation number field of the response message from the server, in the currently used generation number field of the terminal positioning management table 701 (step S2009). The on-vehicle device 102 transmits to the user terminal 201, a message indicating that a change of the generation has been made (step S2010). After the operation at step S2010 comes to an end, the on-vehicle device 102 advances to the operation at step S2002.

If the on-vehicle device 102 determines that the response message from the server is not a post-change generation number setting message (step S2008: NO), the on-vehicle device 102 determines whether the response message from the server is a new generation number setting message (step S2011). If the on-vehicle device 102 determines that the response message from the server is a new generation number setting message (step S2011: YES), the on-vehicle device 102 searches the terminal fundamental-data management table 601, for a record whose generation number field has therein a value that matches the new generation number of the response message from the server (step S2012). The on-vehicle device 102 sets the value of the new generation number fundamental data length of the response message from the server, in the fundamental data length field of the retrieved record (step S2013). The on-vehicle device 102 sets the value of the new generation number fundamental data of the response message from the server, in the fundamental data field of the retrieved record (step S2014).

After the operation at step S2014 comes to an end, or if the on-vehicle device 102 determines that the response message from the server is not a new generation number setting message (step S2011: NO), the on-vehicle device 102 transmits to the user terminal 201, a message indicating that a normal end message has been received (step S2015). After the operation at step S2015 comes to an end, the on-vehicle device 102 advances to the operation at step S2002. In this manner, the process executed by the on-vehicle device for the response message from the server enables the communications system 100 to transmit the ECU information to the server 101 using key information whose security is improved.

Figure 21:
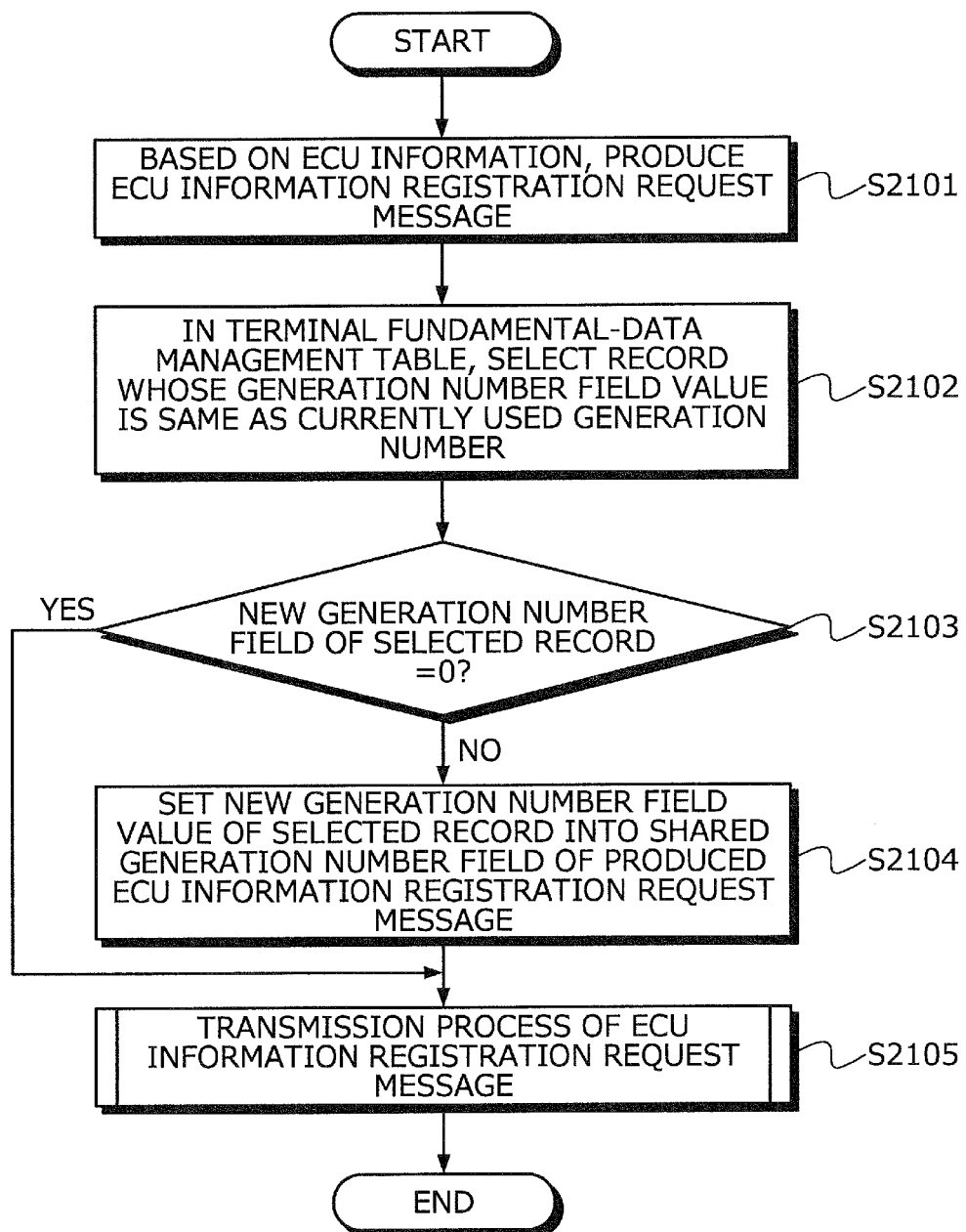
FIG. 21 is a flowchart of an example of a procedure for an ECU information registration request message production process executed by the on-vehicle device.

FIG. 21 is a flowchart of an example of a procedure for the ECU information registration request message production process executed by the on-vehicle device. The ECU information registration request message production process is a process of responding to the ECU information registration request. The on-vehicle device 102 produces the ECU information registration request message, based on the ECU information (step S2101). The on-vehicle device 102 selects a record whose generation number field has therein the same value as the currently used generation number, in the terminal fundamental-data management table 601 (step S2102). The on-vehicle device 102 determines whether the new generation number field of the selected record has "0" therein (step S2103). If the on-vehicle device 102 determines that the new generation number field does not have "0" therein (step S2103: NO), the on-vehicle device 102 sets the value of the new generation number field of the selected record, in the shared generation number field of the produced ECU information registration request message (step S2104).

After the operation at step S2104 comes to an end, or if the on-vehicle device 102 determines that the new generation number field has "0" therein (step S2103: YES), the on-vehicle device 102 executes an ECU information registration request message transmission process (step S2105). Details of the ECU information registration request message transmission process will be described later with reference to FIG. 22. After execution of the operation at step S2105 comes to an end, the on-vehicle device 102 causes the ECU information registration request message production process executed by the on-vehicle device to come to an end. The ECU information registration request message production process executed by the on-vehicle device enables the communications system 100 to respond to the ECU information registration request.

Figure 22:
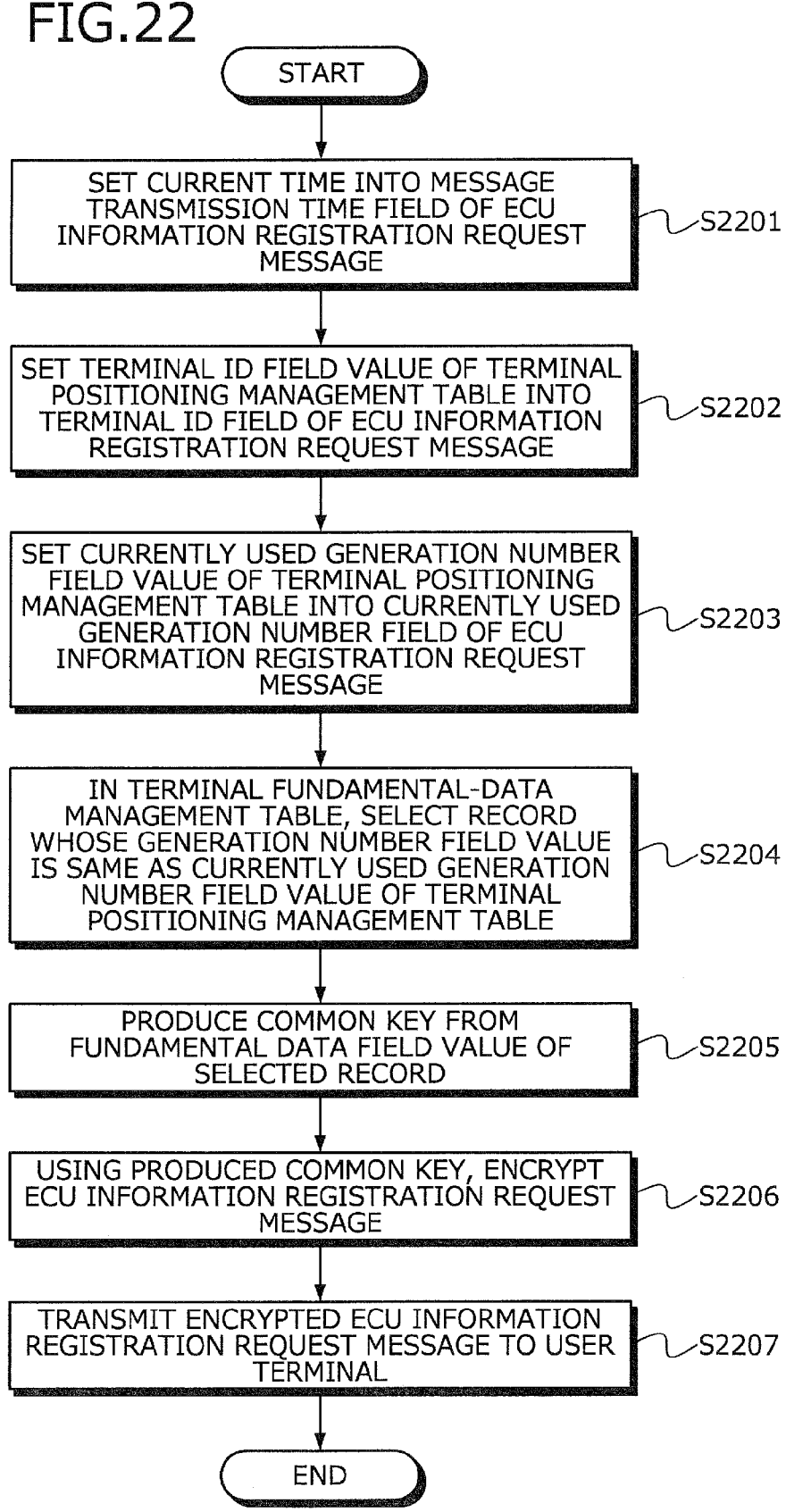
FIG. 22 is a flowchart of an example of a procedure for an ECU information registration request message transmission process executed by the on-vehicle device.

FIG. 22 is a flowchart of an example of a procedure for the ECU information registration request message transmission process executed by the on-vehicle device. The ECU information registration request message transmission process executed by the on-vehicle device is a process of producing the ECU information registration request message and transmitting the produced message to the server 101. The on-vehicle device 102 sets the current time in the message transmission time field of the ECU information registration request message (step S2201). If the on-vehicle device 102 has no way of obtaining the current time, the on-vehicle device 102 may set in the current time field, the value in the current time field of the response message from the server received in the operation at step S2002 of FIG. 20. The on-vehicle device 102 sets the value in the terminal ID field of the terminal positioning management table 701, into the terminal ID field of the ECU information registration request message (step S2202).

The on-vehicle device 102 sets the value of the currently used generation number field of the terminal positioning management table 701, into the currently used generation number field of the ECU information registration request message (step S2203). The on-vehicle device 102 selects a record whose generation number field has the same value set therein as that of the currently used generation number field of the terminal positioning management table 701, in the terminal fundamental-data management table 601 (step S2204). The on-vehicle device 102 produces the common key from the value in the fundamental data field of the selected record (step S2205).

The on-vehicle device 102 encrypts the ECU information registration request message using the produced common key (step S2206). The on-vehicle device 102 transmits the encrypted ECU information registration request message to the user terminal 201 (step S2207). After the operation at step S2207 comes to an end, the on-vehicle device 102 causes the ECU information registration request message transmission process executed by the on-vehicle device to come to an end. The ECU information registration request message transmission process executed by the on-vehicle device enables the communications system 100 to produce the ECU information registration request message and transmit the produced message to the server 101.

Figure 23:
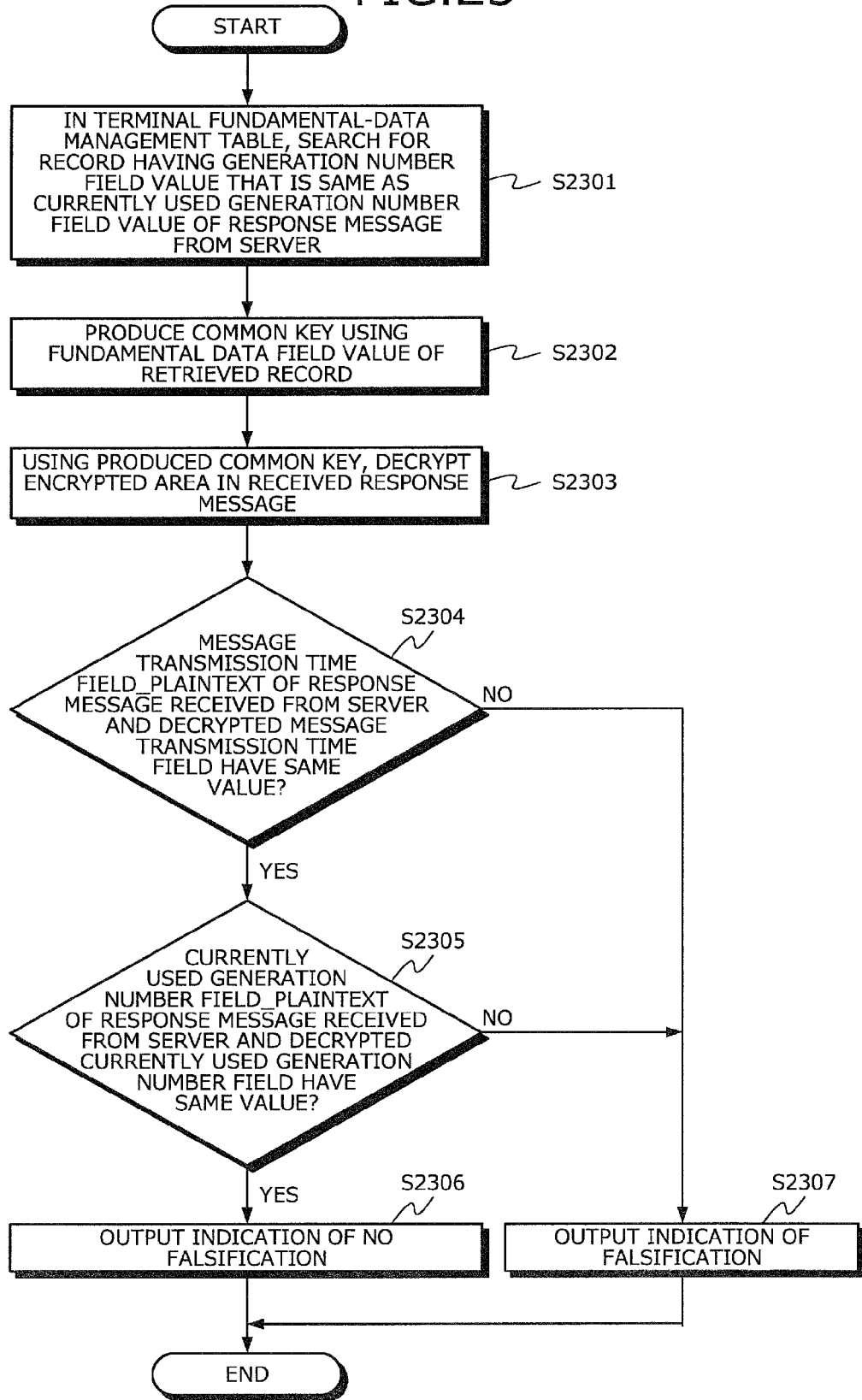
FIG. 23 is a flowchart of an example of a procedure for a falsification detection process executed by the on-vehicle device, for a response message from the server.

FIG. 23 is a flowchart of an example of a procedure for a falsification detection process executed by the on-vehicle device, for a response message from the server. The terminal falsification detection process executed by the on-vehicle device is a process of detecting falsification of a response message from the server. The on-vehicle device 102 searches for a record whose generation number field has the same value set therein as that in the currently used generation number field of the response message from the server, in the terminal fundamental-data management table 601 (step S2301). The on-vehicle device 102 produces the common key using the value in the fundamental data field of the retrieved record (step S2302). The on-vehicle device 102 decrypts the encrypted area in the received response message from the server, using the produced common key (step S2303).

The on-vehicle device 102 determines whether the message transmission time field_plaintext of the received response message from the server is same as the decrypted value of the message transmission time field (step S2304). If the on-vehicle device 102 determines that the message transmission time field_plaintext is same as the value (step S2304: YES), the on-vehicle device 102 determines whether the currently used generation number field_plaintext of the received response message from the server is same as the decrypted value in the currently used generation number field (step S2305).

If the on-vehicle device 102 determines that the currently used generation number field_plaintext is same as the value (step S2305: YES), the on-vehicle device 102 outputs data indicating that the response message from the server is not falsified (step S2306). If the on-vehicle device 102 determines that the field_plaintext is not same as the value (step 2304: NO, step S2305: NO), the on-vehicle device 102 outputs data indicating that the response message from the server is falsified (step S2307). After the operation at step S2306 or S2307 comes to an end, the on-vehicle device 102 causes the terminal falsification detection process executed by the on-vehicle device to come to an end. The falsification detection process for the response message from the server executed by the on-vehicle device enables the communications system 100 to determine whether the response message from the server is falsified.

Figure 24:
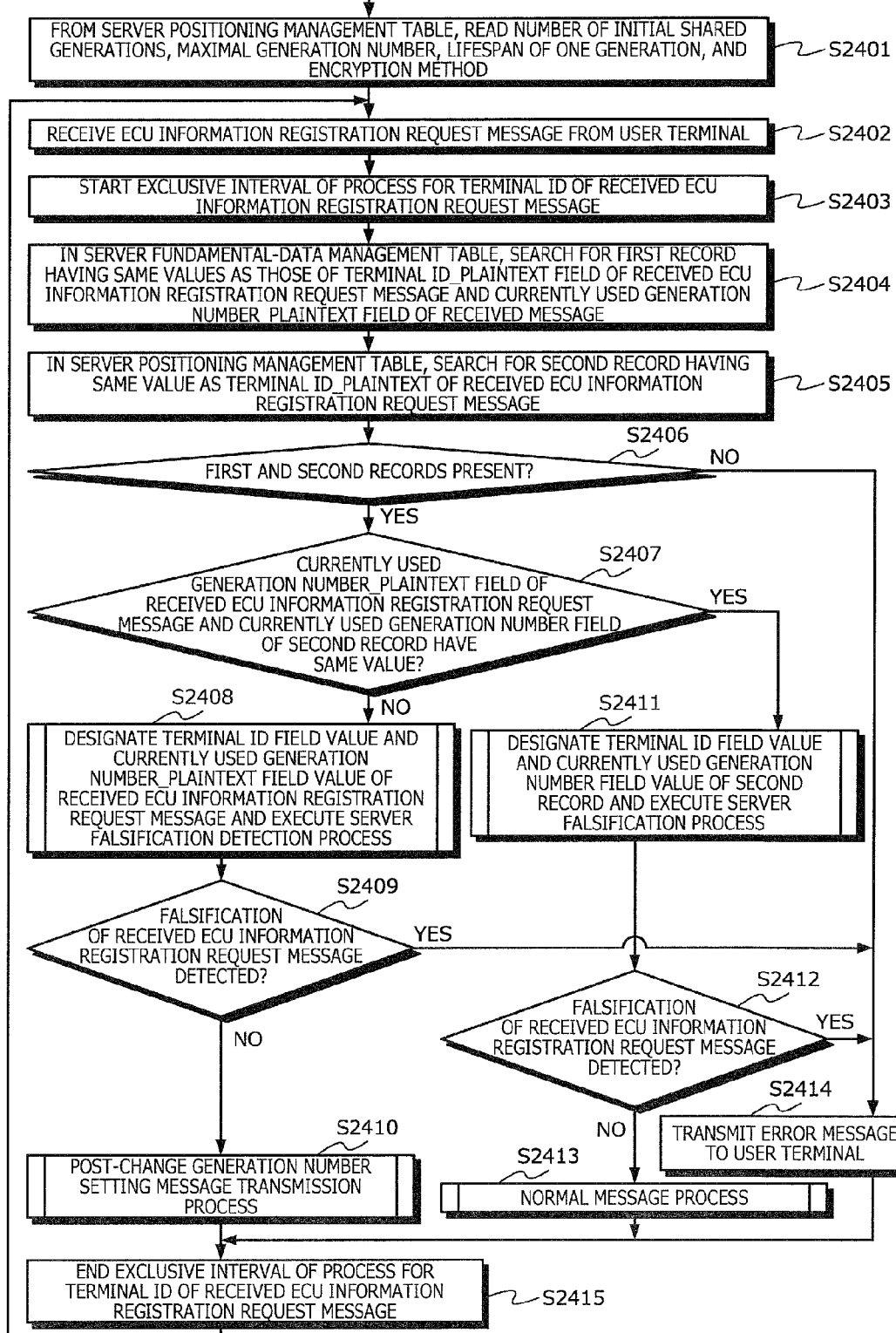
FIG. 24 is a flowchart of an example of a procedure for a message process executed by the server.

FIG. 24 is a flowchart of an example of a procedure for the message process executed by the server. The message process executed by the server is a process for the ECU information registration request message received from the user terminal 201. The server 101 reads the number of initial shared generations, the maximal generation number, the lifespan of one generation, and the encryption method from the server positioning management table 501 (step S2401). The server 101 receives the ECU information registration request message from the user terminal 201 (step S2402).

The server 101 starts an exclusive interval of a process for the terminal ID of the received ECU information registration request message (step S2403). The server 101 searches for a first record having the same values as those of the terminal ID_plaintext field of the received ECU information registration request message and the currently used generation number_plaintext field of the received ECU information registration request message in the server fundamental-data management table 401 (step S2404). The server 101 searches for a second record having the same value as that of the terminal ID_plaintext of the received ECU information registration request message, in the server positioning management table 501 (step S2405).

The server 101 determines whether the first and the second records are present (step S2406). If the server 101 determines that the first and the second records are present (step S2406: YES), the server 101 determines whether the value in the currently used generation number_plaintext field of the received ECU information registration request message is same as the value in the currently used generation number field of the second record (step S2407). If the server 101 determines that the value of the currently used generation number_plaintext field is different from the value of the currently used generation number field (step S2407: NO), the server 101 designates the value of the terminal ID field and the value of the currently used generation number_plaintext field of the received ECU information registration request message, and executes the server falsification detection process (step S2408). Details of the server falsification detection process will be described later with reference to FIG. 31.

After the operation at step S2408 comes to an end, the server 101 determines whether the received ECU information registration request message has been detected to be falsified (step S2409). If the server 101 determines that the received ECU information registration request message has not been detected to be falsified (step S2409: NO), the server 101 executes the post-change generation number setting message transmission process (step S2410).

If the server 101 determines that the value of the currently used generation number_plaintext field is same as the value of the currently used generation number field (step S2407: YES), the server 101 designates the value in the terminal ID field and the value in the currently used generation number field of the second record, and executes the server falsification detection process (step S2411). The server 101 determines whether the received ECU information registration request message has been detected to be falsified (step S2412). If the server determines that the received ECU information registration request message has not been detected to be falsified (step S2412: NO), the server 101 executes a normal message process (step S2413).

If the server 101 determines that the first or the second record is not present (step S2406: NO), or if the server 101 determines that the received ECU information registration request message has been detected to be falsified (step S2409: YES, step S2412: YES), the server 101 transmits to the user terminal 201, a message giving notification of an error (step S2414).

After any operation among those at steps S2410, S2413, and S2414 comes to an end, the server 101 causes the exclusive interval of the process for the terminal ID of the received ECU information registration request message to come to an end (step S2415). After the operation at step S2415 comes to an end, the server 101 advances to the operation at step S2402. The message process executed by the server enables the communications system 100 to communicate with the on-vehicle device 102 using the common key.

Figure 25:
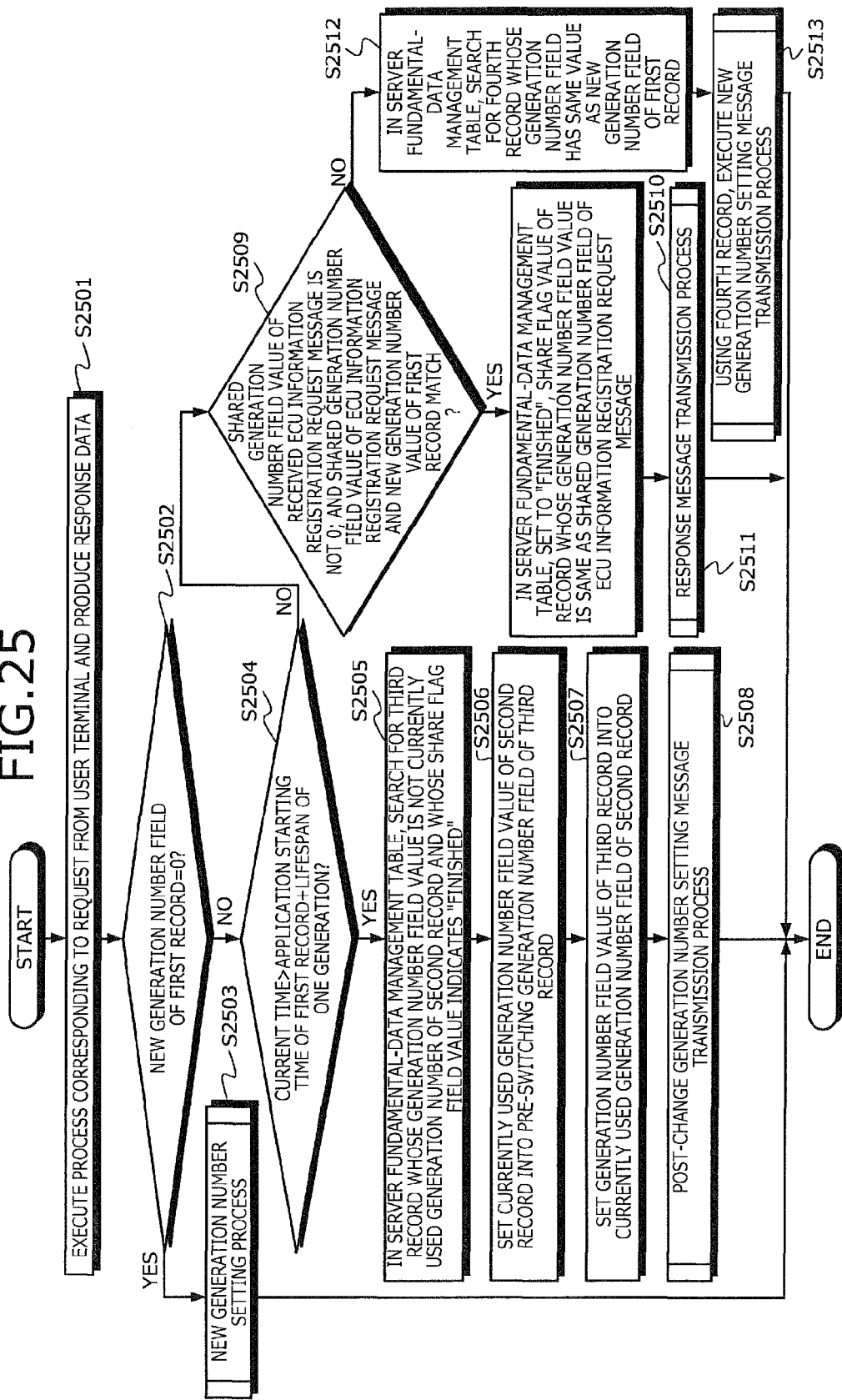
FIG. 25 is a flowchart of an example of a procedure for a normal message process executed by the server.

FIG. 25 is a flowchart of an example of a procedure for the normal message process executed by the server. The normal message process is a process executed by the server with respect to an ECU information registration request message that is not falsified and that is encrypted using the key information designated by the currently used generation number of the server 101.

In FIGS. 25 to 31, the process of searching for a record in the server fundamental-data management table 401 will not be described because a condition is imposed as to whether the received ECU information registration request message is same as the value in the terminal ID field.

The server 101 executes the process corresponding to a request from the user terminal 201, and produces response data (step S2501). The response data is data to be a return value of the process corresponding to the request from the user terminal 201. For example, when the ECU information registration request is received from the user terminal 201, the response data is, for example, a value indicating "registration successful" or "registration failed".

The server 101 determines whether the new generation number field of the first record has "0" therein (step S2502). If the server 101 determines that the new generation number field has "0" therein (step S2502: YES), the server 101 executes a new generation number setting process (step S2503). The new generation number setting process will be described later with reference to FIG. 26. After the operation at step S2503 comes to an end, the server 101 causes the normal message process executed by the server to come to an end.

If the server 101 determines that the new generation number field does not have "0" therein (step S2502: NO), the server 101 determines whether the current time is greater than (the application starting time of the first record+the lifespan of one generation) (step S2504). If the server 101 determines that the current time is greater than (the application starting time of the first record+the lifespan of one generation) (step S2504: YES), the server 101 searches for a third record whose generation number field has therein a value other than the currently used generation number of the second record and whose share flag field has therein the value indicating "finished", in the server fundamental-data management table 401 (step S2505).

The server 101 sets the value in the currently used generation number field of the second record, into the pre-switching generation number field of the third record (step S2506). The server 101 sets the value in the generation number field of the third record, into the currently used generation number field of the second record (step S2507). The server 101 executes a post-change generation number setting message transmission process (step S2508). Details of the post-change generation number setting message transmission process will be described later with reference to FIG. 28. After the operation at step S2508 comes to an end, the server 101 causes the normal message process executed by the server to come to an end.

If the server 101 determines that the current time is less than or equal to (the application starting time of the first record+the lifespan of one generation) (step S2504: NO), the server 101 determines whether the value in the shared generation number field of the received ECU information registration request message is a value other than "0" and whether the value in the shared generation number field of the received ECU information registration request message matches the value of the new generation number of the first record (step S2509). If the server 101 determines that the value is a value other than "0" and the value in the shared generation number field matches the value of the new generation number (step S2509: YES), the server 101 sets the value indicating "finished" to be the value in the share flag field of the record whose generation number field has therein the same value as that in the shared generation number field of the ECU information registration request message, in the server fundamental-data management table 401 (step S2510). A case where (step S2509: YES) is established indicates that the fundamental data designated by the generation number indicated by the value in the new generation number field of the ECU information registration request message can be shared between the server 101 and the on-vehicle device 102.

The server 101 executes a response message transmission process (step S2511). Details of the response message transmission process will be described later with reference to FIG. 30. After the operation at step S2511 comes to an end, the server 101 causes the normal message process executed by the server to come to an end.

If the server 101 determines that the value is a value other than "0" and that the value in the shared generation number field does not match the value of the new generation number (step S2509: NO), the server 101 searches for a fourth record whose generation number field has the same value set therein as that in the new generation number field of the first record, in the server fundamental-data management table 401 (step S2512). A state where (step S2509: NO) is established is a state where the shared generation number of the ECU information registration request message is not set. A case where this state is established is a case, for example, where the fundamental data of the new generation number transmitted from the server 101 has not yet arrived at the on-vehicle device 102. Therefore, the server 101 again transmits the fundamental data of the new generation number.

The server 101 executes a new generation number setting message transmission process using the fourth record (step S2513). Details of the new generation number setting message transmission process will be described later with reference to FIG. 29. After the operation at step S2513 comes to an end, the server 101 causes the normal message process executed by the server to come to an end. The normal message process executed by the server enables the communications system 100 to execute the process for the response message that is not falsified and that is encrypted using the key information designated by the currently used generation number of the server 101.

Figure 26:
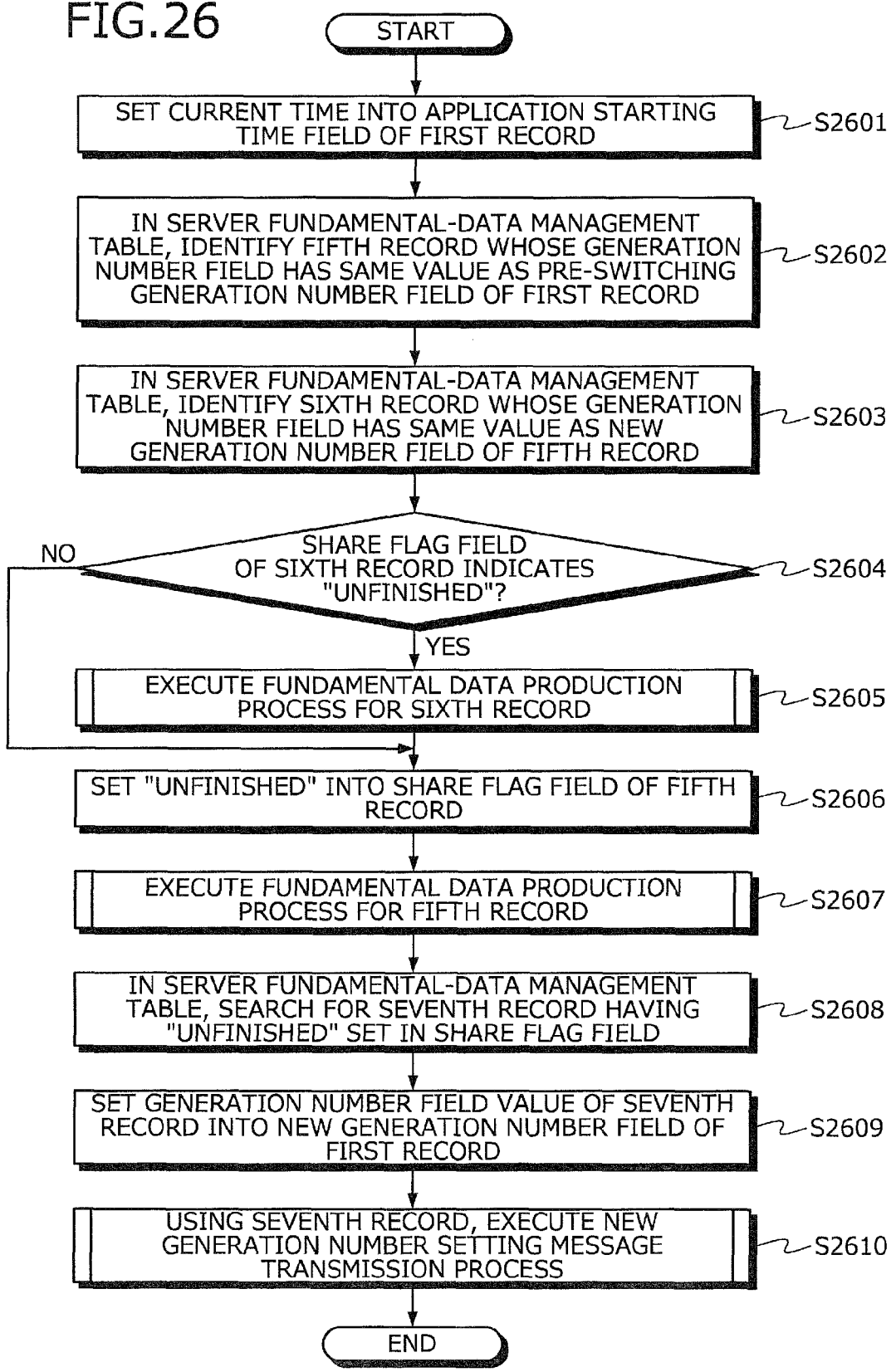
FIG. 26 is a flowchart of an example of a procedure for a new generation number setting process executed by the server.

FIG. 26 is a flowchart of an example of a procedure for the new generation number setting process executed by the server. The new generation number setting process executed by the server is a process of setting new fundamental data in the server fundamental-data management table 401.

The server 101 sets the current time in the application starting time field of the first record (step S2601). The server 101 identifies a fifth record whose generation number field has the same value set therein as that in the pre-switching generation number field of the first record, in the server fundamental-data management table 401 (step S2602). The server 101 identifies a sixth record whose generation number field has the same value set therein as that in the new generation number field of the fifth record, in the server fundamental-data management table 401 (step S2603).

The server 101 determines whether the share flag field of the sixth record has "unfinished" therein (step S2604). If the server 101 determines that the share flag field has "unfinished" therein (step S2604: YES), the server 101 executes a fundamental data production process for the sixth record (step S2605). Details of the fundamental data production process will be described later with reference to FIG. 27. After the operation at step S2605 comes to an end, or if the server 101 determines that the share flag field has "finished" therein (step S2604: NO), the server 101 sets "unfinished" in the share flag field of the fifth record (step S2606).

The server 101 executes the fundamental data production process for the fifth record to be processed (step S2607). The server 101 searches for a seventh record whose share flag field has "unfinished" set therein, in the server fundamental-data management table 401 (step S2608). The server 101 sets the value in the generation number field of the seventh record, in the new generation number field of the first record (step S2609). The server 101 executes the new generation number setting message transmission process using the seventh record (step S2610). After the operation at step S2610 comes to an end, the server 101 causes the new generation number setting process executed by the server to come to an end. The new generation number setting process executed by the server causes the communications system 100 to delete the fundamental data whose lifespan expires and that is not used, and prepare the new fundamental data; and therefore, enables the communications system 100 to prepare new fundamental data one after another within the range of the limited memory area.

Figure 27:
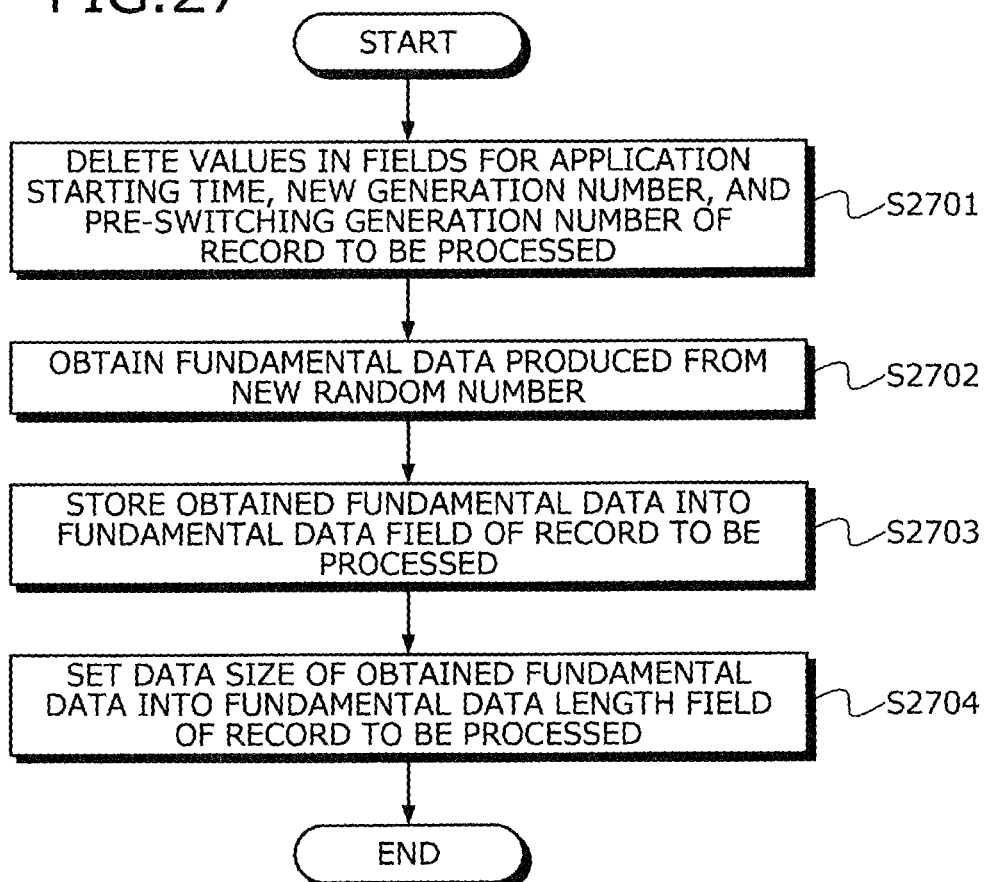
FIG. 27 is a flowchart of an example of a procedure for a fundamental data production process executed by the server.

FIG. 27 is a flowchart of an example of a procedure for the fundamental data production process executed by the server. The fundamental data production process executed by the server is a process of producing the fundamental data. The server 101 deletes the values in the fields for the application starting time, the new generation number, and the pre-switching generation number of the record to be processed (step S2701). The server 101 obtains the fundamental data produced from a new random number (step S2702). The server 101 stores the obtained fundamental data in the fundamental data field of the record to be processed (step S2703). The server 101 sets the data size of the obtained fundamental data, in the fundamental data length field of the record to be processed (step S2704). After the operation at step S2704 comes to an end, the server 101 causes the fundamental data production process executed by the server to come to an end. The fundamental data production process executed by the server enables the communications system 100 to prepare the new fundamental data.

Figure 28:
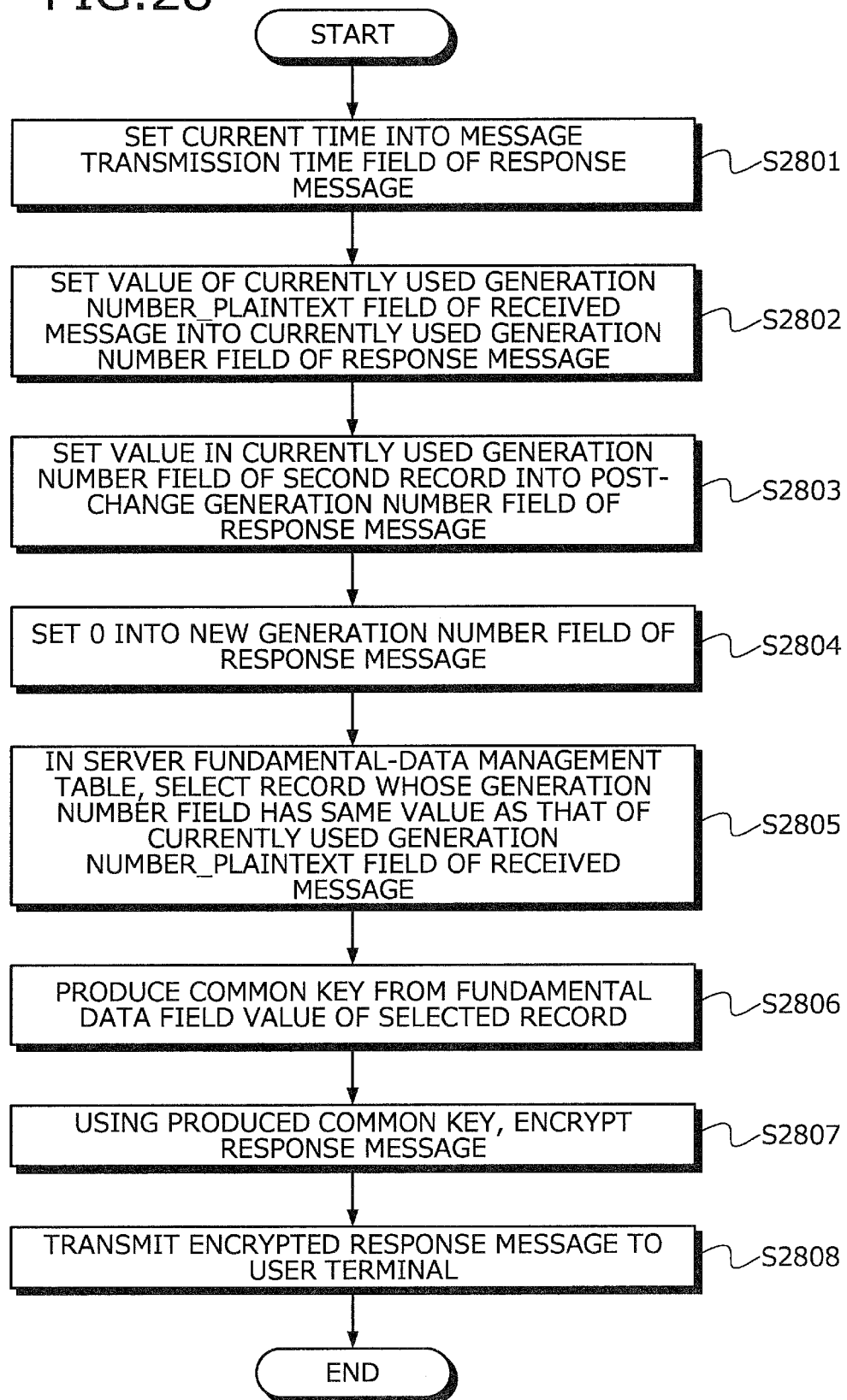
FIG. 28 is a flowchart of an example of a procedure for a post-change generation number setting message transmission process executed by the server.

FIG. 28 is a flowchart of an example of a procedure for a post-change generation number setting message transmission process executed by the server. The post-change generation number setting message transmission process executed by the server is a process of producing the post-change generation number setting message and transmitting the produced message to the on-vehicle device 102. The server 101 sets the current time into the message transmission time field of the response message (step S2801). The server 101 sets the value of the currently used generation number_plaintext field of the received message into the currently used generation number field of the response message (step S2802). The server 101 respectively sets the values of the message transmission time field and the currently used generation number field into the message transmission time_plaintext field and the currently used generation number_plaintext field in the response message.

The server 101 sets the value in the currently used generation number field of the second record into the post-change generation number field of the response message (step S2803). The server 101 sets "0" into the new generation number field of the response message (step S2804). The server 101 selects the record whose generation number field has the same value set therein as that in the currently used generation number_plaintext field of the received message, in the server fundamental-data management table 401 (step S2805). The server 101 produces the common key from the value in the fundamental data field of the selected record (step S2806).

The server 101 encrypts the response message using the produced common key (step S2807). The server 101 transmits the encrypted response message to the user terminal 201 (step S2808). After the operation at step S2808 comes to an end, the communications system 100 can transmit the post-change generation number setting message to the on-vehicle device 102.

Figure 29:
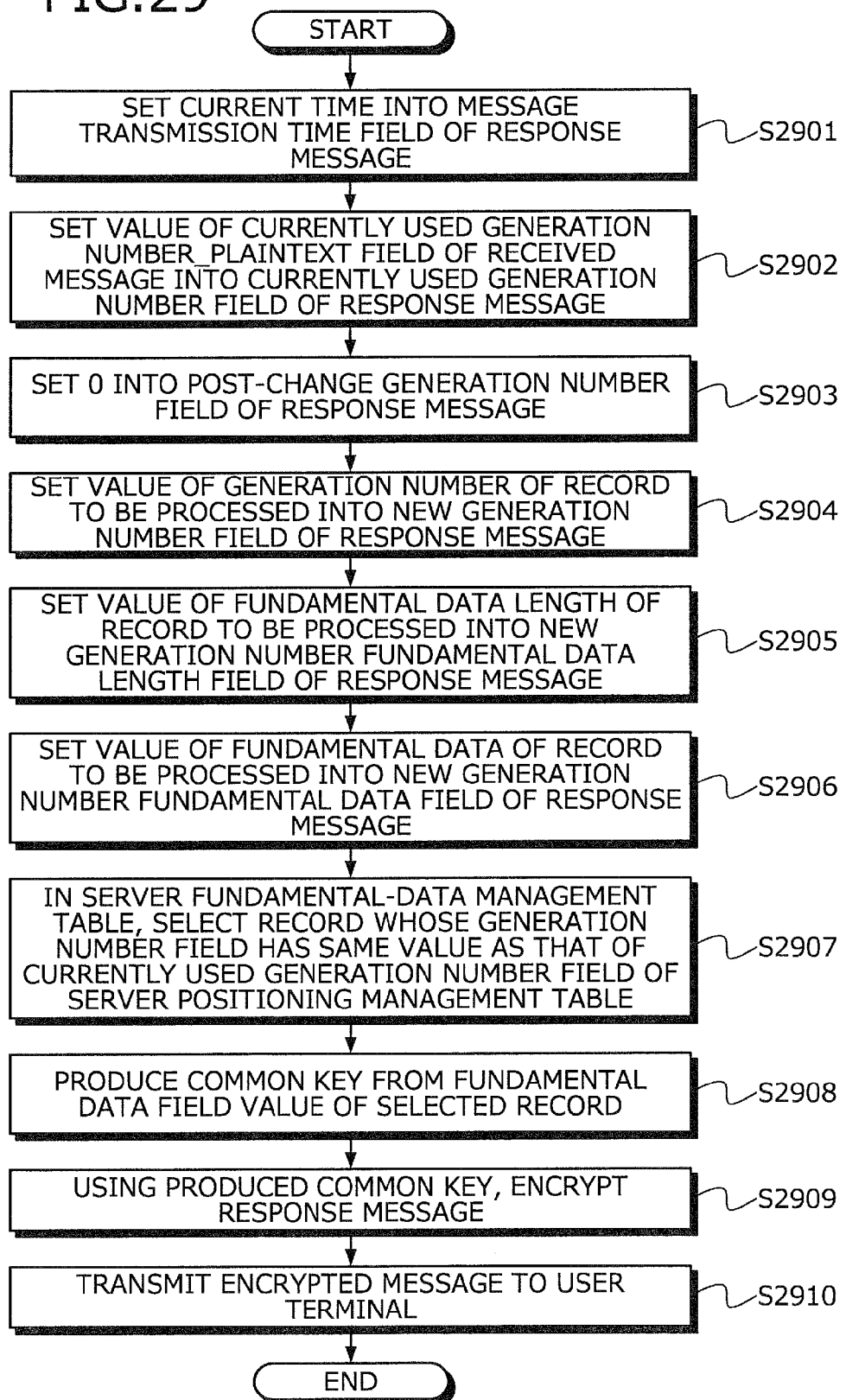
FIG. 29 is a flowchart of an example of a procedure for the new generation number setting message transmission process executed by the server.

FIG. 29 is a flowchart of an example of a procedure for the new generation number setting message transmission process executed by the server. The new generation number setting message transmission process executed by the server is a process of producing the new generation number setting message and transmitting the produced message to the on-vehicle device 102. The operations at steps S2901, S2902, and S2908 to S2910 of FIG. 29 are same as those at steps S2801, S2802, and S2806 to S2808 and therefore, will not again be described.

After the operation at step S2902 comes to an end, the server 101 sets "0" in the post-change generation number field of the response message (step S2903). The server 101 sets the value of the generation number of the record to be processed into the new generation number field of the response message (step S2904). The server 101 sets the value of the fundamental data length of the record to be processed into the new generation number fundamental data length field of the response message (step S2905). The server 101 sets the value of the fundamental data of the record to be processed into the new generation number fundamental data field of the response message (step S2906).

The server 101 selects a record whose generation number field has the same value set therein as that in the currently used generation number field of the server positioning management table 501, in the server fundamental-data management table 401 (step S2907). After the operation at step S2907 comes to an end, the server 101 executes the operation at step S2908. The new generation number setting message transmission process executed by the server enables the communications system 100 to transmit the new generation number setting message to the on-vehicle device 102.

Figure 30:
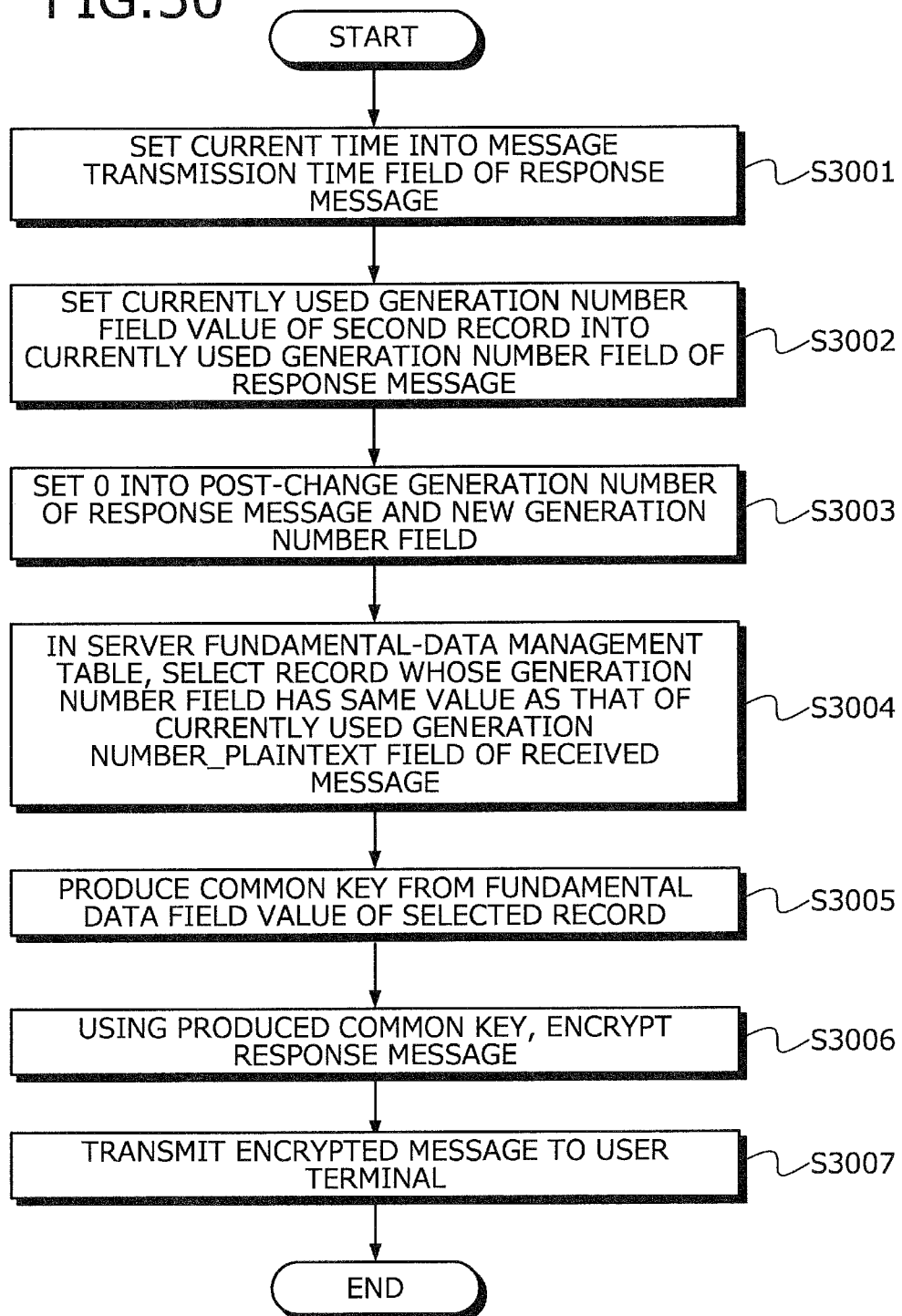
FIG. 30 is a flowchart of an example of a procedure for a response message transmission process executed by the server.

FIG. 30 is a flowchart of an example of a procedure for the response message transmission process executed by the server. The response message transmission process executed by the server is a process of producing the response message and transmitting the produced message to the on-vehicle device 102. Operations at steps S3001, S3002, S3005 to S3007 of FIG. 30 are same as those at steps S2801, S2802, S2806 to S2808 and therefore, will not again be described.

After the operation at step S3002 comes to an end, the server 101 sets "0" in each of the post-change generation number field and the new generation number field of the response message (step S3003). The server 101 selects a record whose generation number field has the same value set therein as that in the currently used generation number_plaintext field of the received message, in the server fundamental-data management table 401 (step S3004). After step S3004 comes to an end, the server 101 executes the operation at step S3005. The response message transmission process executed by the server enables the communications system 100 to transmit the response message to the on-vehicle device 102.

Figure 31:
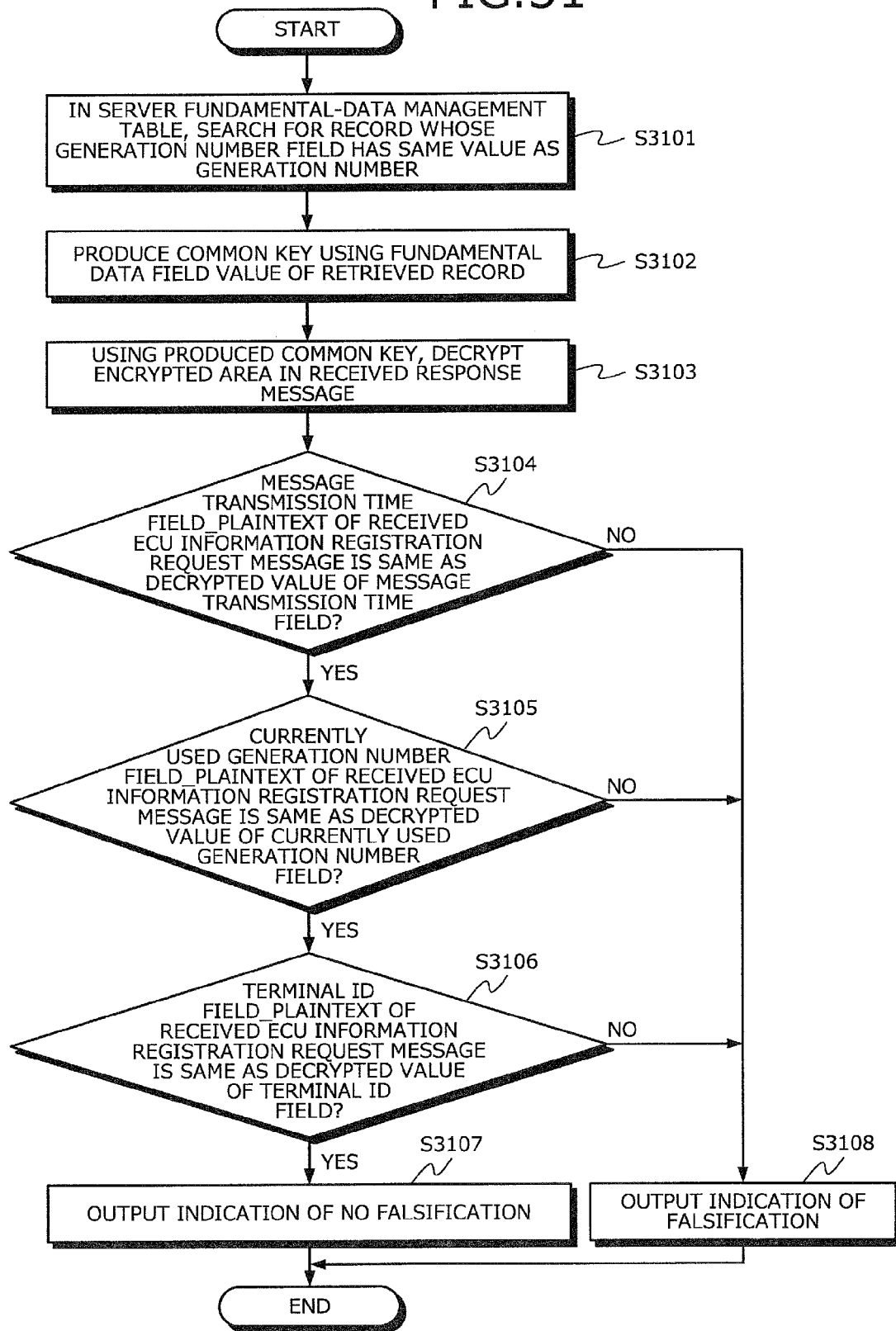
FIG. 31 is a flowchart of an example of a procedure for a server falsification detection process executed by the server.

FIG. 31 is a flowchart of an example of a procedure for the server falsification detection process executed by the server. The server falsification detection process executed by the server is a process of detecting any falsification of the ECU information registration request message. Compared to the operations at steps S2302 to S2307, at steps S3102 to S3105, S3107, and S3108, the execution entity is changed from the on-vehicle device 102 to the server 101 and the process contents are same. Therefore, steps S3102 to S3105, S3107, and S3108 will not again be described.

The server 101 searches for a record whose generation number field has the same value set therein as the generation number, in the server fundamental-data management table 401 (step S3101). After the operation at step S3101 comes to an end, the server 101 executes the operation at step S3102.

If (step S3105: YES) is established, the server 101 determines whether the value of the terminal ID field_plaintext of the received ECU information registration request message is same as the decrypted value in the terminal ID field (step S3106). If the server 101 determines that the value of the terminal ID field_plaintext is same as the value in the decrypted terminal ID field (step S3106: YES), the server 101 executes the operation at step S3107. If the server 101 determines that the value of the terminal ID field_plaintext is not same as the value in the decrypted terminal ID field (step S3106: NO), the server 101 executes the operation at step S3103. The terminal falsification detection process executed by the server enables the communications system 100 to determine whether the ECU information registration request message has been falsified.

As described, according to the server 101, each time encrypted text is received from the communication counterpart, if no next key for a key is present, the next key is set; the next key is encrypted using any of the keys; and the encrypted next key is transmitted. Thereby, the communications system 100 can improve the security thereof because the next key is encrypted using any of the keys that is used for encryption only once. For example, in a case where any of the keys becomes invalid, when the key information of the next key is transmitted after being encrypted using any of the keys, a third party can also obtain the next key in the event that the third party has already derived any of the keys. According to the communications method according to the present embodiment, the next key is transmitted after being encrypted using the key first used for encryption and therefore, the possibility can be reduced that the next key is derived by a third party. Therefore, security can be improved.

According to the server 101, if any of the keys is invalid, the identification information of the next key to be used may be transmitted to the on-vehicle device 102 after being encrypted using the key information of any of the keys. Thereby, the key information of the next key to be used is transmitted to the on-vehicle device 102 in advance and therefore, the key information of the next key to be used does not need to be transmitted when the server 101 switches the key to the next key to be used. Therefore, the communications system 100 can improve the security of the communication.

According to the server 101, if the identification information of the next key to be used is not stored, the previous key previously used may be identified, and a key different from the previous key among the plural keys stored in the server fundamental-data management table 401 may be obtained as the next key. Thereby, the server 101 does not use a key used in the past, again for any encryption and the communications system 100 can improve the security of communication.

According to the server 101, if the identification information of the next key to be used is not stored, the key information of the previous key previously used and the identification information of the previous key may be deleted from the server fundamental-data management table 401. Thereby, the server 101 can delete the contents of the storage area having the key stored therein. When the server 101 searches for the key, the server 101 can reduce the processing time necessary for the search because the number of records to be searched is reduced.

The server 101 determines whether the common key is first used for encryption, based on whether the identification information of the next key to be used is stored. Therefore, the server 101 does need to count the number of times the common key is used. The server 101 may count the number of times the common key is used and obtain the next key to be used when the count reaches a specific number of times. The server 101 may change the specific number of times for each key.

An encryption method other than the common key encryption method can be a public key encryption method. However, the public key encryption method needs large overhead for the encryption process and therefore, an apparatus with a low processing capacity such as the on-vehicle device 102 consumes a lot of time for the encryption process. The communications method according the present embodiment is a common key encryption method and therefore, even an apparatus with a low processing capacity such as the on-vehicle device 102 can execute the encryption process in a short processing period.

The communications system 100 according to the present embodiment does not transmit a common key itself but rather transmits and receives the fundamental data to be the production source of the common key. Therefore, even in a case where a third party derives the fundamental data, if the third party cannot identify the method of producing the common key from the fundamental data, the communications system 100 can maintain the security of the communication.

The communications system 100 according to the present embodiment is applicable to transmission and reception of information of a home appliance, information of a medical device, or operational information of a device used by a consumer in addition to transmission and reception of the ECU information of a car. The communications system 100 according to the present embodiment may be a system without communicating through the user terminal 201.

The communications method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing therein a communication program that causes a computer to execute a process comprising:
   receiving from a communication counterpart apparatus encrypted data and identification information of a first key with which the encrypted data was encrypted, the first key being one of a plurality of keys used for a common key encryption between the computer and the communication counterpart apparatus;
   determining whether identification information of a key to be used subsequent to the first key is stored and correlated with the identification information of the first key, based on the identification information of the first key and by referring to a storing unit of the computer storing the plurality of keys and identification information corresponding to the plurality of the keys thereof;
   obtaining a second key and identification information of the second key when the identification information of the key is not stored according to the determining, the second key being one of the plurality of keys and different from the first key;
   storing and correlating the identification information of the second key with the identification information of the first key;
   encrypting the second key and the identification information of the second key with the first key; and
   transmitting the encrypted second key, the encrypted identification information of the second key, and the identification information of the first key to the communication counterpart apparatus.

2. The non-transitory computer-readable recording medium according to claim 1 causing the computer to further execute:
   determining, when the identification information of the key to be used subsequent to the first key is stored, whether the first key is valid based on an elapsed time from a time when the first key is first used or based on a usage count of the first key;
   encrypting, when the first key is invalid, the identification information of the key with the first key; and
   transmitting to the communication counterpart apparatus, the encrypted identification information of the key and the identification information of the first key.

3. The non-transitory computer-readable recording medium according to claim 1 causing the computer to further execute
   identifying, based on storage contents of the storing unit and when the identification information of the key to be used subsequent to the first key is not stored, a previous key used before the first key by the communication counterpart apparatus, wherein
   the obtaining includes obtaining the second key and the identification information of the second key that is different from the first key and the identified previous key.

4. The non-transitory computer-readable recording medium according to claim 1 causing the computer to further execute:
   identifying, based on storage contents of the storing unit and when the identification information of the key to be used subsequent to the first key is not stored, a previous key used before the first key by the communication counterpart apparatus; and
   deleting the identified previous key and identification information thereof from the storing unit, wherein
   the obtaining includes obtaining the second key and the identification information of the second key that is different from the first key, from the storing unit after deletion at the deleting.

5. A communications apparatus comprising:
   a memory; and
   a hardware processor coupled to the memory and configured to:
      receive from a communication counterpart apparatus encrypted data and identification information of a first key with which the encrypted data was encrypted, the first key being one of a plurality of keys used for a common key encryption between the computer and the communication counterpart apparatus;

determine whether identification information of a key to be used subsequent to the first key is stored and correlated with the identification information of the first key, based on the identification information of the first key and by referring to a storing unit of the computer storing the plurality of keys and identification information corresponding to the plurality of the keys thereof;

obtain a second key and identification information of the second key when the identification information of the key is not stored in the storing unit, the second key being one of the plurality of keys and different from the first key;

store and correlate the identification information of the second key with the identification information of the first key;

encrypt the second key and the identification information of the second key with the first key; and transmit the encrypted second key, the encrypted identification information of the second key, and the identification information of the first key to the communication counterpart apparatus.

6. A communications method of a computer, the communications method comprising:

receiving from a communication counterpart apparatus encrypted data and identification information of a first key with which the encrypted data was encrypted, the first key being one of a plurality of keys used for a common key encryption between the communications apparatus and the communication counterpart apparatus;

determining whether identification information of a key to be used subsequent to the first key is stored and correlated with the identification information of the first key, based on the identification information of the first key and by referring to a storing unit of the communications apparatus storing the plurality of keys and identification information corresponding to the plurality of the keys thereof;

obtaining a second key and identification information of the second key when the identification information of the key is not stored according to the determining, the second key being one of the plurality of keys and different from the first key;

storing the identification information of the second key correlated with the identification information of the first key;

encrypting the second key and the identification information of the second key with the first key; and transmitting the encrypted second key, the encrypted identification information of the second key, and the identification information of the first key to the communication counterpart apparatus.

* * * * *